United States Patent
Xu et al.

(10) Patent No.: US 12,520,370 B2
(45) Date of Patent: Jan. 6, 2026

(54) METHODS, APPARATUSES, AND COMPUTER READABLE MEDIA FOR CONTROLLING MESSAGE TRANSMISSIONS IN INTEGRATED ACCESS AND BACKHAUL NETWORK

(71) Applicant: Nokia Solutions and Networks Oy, Espoo (FI)

(72) Inventors: Xiang Xu, Beijing (CN); Henri Markus Koskinen, Espoo (FI); Esa Mikael Malkamäki, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 338 days.

(21) Appl. No.: 18/555,666

(22) PCT Filed: Apr. 25, 2021

(86) PCT No.: PCT/CN2021/089537
§ 371 (c)(1),
(2) Date: Oct. 16, 2023

(87) PCT Pub. No.: WO2022/226677
PCT Pub. Date: Nov. 3, 2022

(65) Prior Publication Data
US 2024/0215098 A1    Jun. 27, 2024

(51) Int. Cl.
*H04W 4/00*        (2018.01)
*H04W 28/06*    (2009.01)
(Continued)

(52) U.S. Cl.
CPC ........... *H04W 76/20* (2018.02); *H04W 28/06* (2013.01); *H04W 88/08* (2013.01)

(58) Field of Classification Search
CPC ..... H04W 76/20; H04W 28/06; H04W 88/08; H04W 88/04; H04W 36/00; H04W 28/04;
(Continued)

(56) References Cited

U.S. PATENT DOCUMENTS 8,902,805 B2 * 12/2014 Ulupinar ................. H04L 61/50
370/315
2020/0145967 A1    5/2020 Park et al.
(Continued)

FOREIGN PATENT DOCUMENTS

| CN | 112088544 A | 12/2020 |
| WO | 2019/001768 A1 | 1/2019 |
| WO | 2021/031000 A1 | 2/2021 |

OTHER PUBLICATIONS

"3rd Generation Partnership Project; Technical Specification Group Radio Access Network; NG-RAN; F1 application protocol (F1AP) (Release 16)", 3GPP TS 38.473, V16.4.0, Jan. 2021, pp. 1-461.
(Continued)

*Primary Examiner* — Phuongchau Ba Nguyen
(74) *Attorney, Agent, or Firm* — Nokia Solutions and Networks Oy

(57) ABSTRACT

Disclosed are methods for controlling message transmissions in an integrated access and backhaul network. An example method may include: determining, by a donor central unit in an integrated access and backhaul network, at least one configuration for controlling a transmission of at least one radio resource control message from a node to a child node of the node in the integrated access and backhaul network; and transmitting, by the donor central unit the at least one configuration to the node. Related apparatuses and computer readable media are also disclosed.

19 Claims, 8 Drawing Sheets

(51) Int. Cl.
*H04W 76/20* (2018.01)
*H04W 88/08* (2009.01)

(58) Field of Classification Search
CPC ... H04W 72/04; H04W 72/042; H04W 28/08; H04W 28/084; H04W 36/22; H04W 72/12; H04L 5/0007
See application file for complete search history.

(56) References Cited

U.S. PATENT DOCUMENTS

| | | | |
|---|---|---|---|
| 2020/0351874 A1 | 11/2020 | Luo et al. | |
| 2021/0044958 A1 | 2/2021 | Abedini et al. | |
| 2022/0225060 A1* | 7/2022 | Akl | H04W 76/22 |
| 2023/0247495 A1* | 8/2023 | Teyeb | H04W 40/24 |
| | | | 370/331 |
| 2023/0262827 A1* | 8/2023 | Liu | H04W 76/20 |
| | | | 370/329 |
| 2023/0308975 A1* | 9/2023 | Lu | H04W 36/087 |

OTHER PUBLICATIONS

"3rd Generation Partnership Project; Technical Specification Group Radio Access Network; NG-RAN; Architecture description (Release 16)", 3GPP TS 38.401, V16.4.0, Jan. 2021, pp. 1-78.

"Summary of email Discussion on Reduction of Service Interruption reduction", 3GPP TSG-RAN WG3 #111-e, R3-211265, Agenda Item: 13.2.2, Nokia, Jan. 25-Feb. 4, 2021, 23 pages.

"Service interruption reduction for intra-donor migration of IAB-node with descendant nodes", 3GPP TSG-RAN WG3 Meeting #111-e, R3-210657, Agenda Item: 13.2.2, AT&T, Jan. 25-Feb. 4, 2021, 3 pages.

"Discussion on inter-Donor IAB Node Migration procedure ", 3GPP TSG-RAN WG3 Meeting #110-e, R3-206559, Agenda item: 13.2.1, ZTE, Nov. 2-12, 2020, 11 pages.

"Reducing the Service Interruption for IAB", 3GPP TSG-RAN3 Meeting #111-e, R3-210102, Agenda item: 13.2.2, CATT, Jan. 25-Feb. 4, 2021, 4 pages.

"Interruption time reduction for Intra-donor IAB-node Migration", 3GPP TSG-RAN WG3 Meeting #110-e, R3-206257, Agenda Item: 13.2.2, Qualcomm Incorporated, Nov. 2-12, 2020, pp. 1-7.

Chen et al., "QoS Assurance in IAB Network", International Wireless Communications and Mobile Computing (IWCMC), Jun. 15-19, 2020, pp. 1860-1865.

International Search Report and Written Opinion received for corresponding Patent Cooperation Treaty Application No. PCT/CN2021/089537, dated Jan. 26, 2022, 9 pages.

"Summary of email Discussion on Reduction of Service Interruption reduction", 3GPP TSG-RAN WG3 #111-e, R3-211003, Agenda Item: 13.2.2, Nokia, Jan. 25-Feb. 4, 2021, 17 pages.

* cited by examiner

METHODS, APPARATUSES, AND COMPUTER READABLE MEDIA FOR CONTROLLING MESSAGE TRANSMISSIONS IN INTEGRATED ACCESS AND BACKHAUL NETWORK

RELATED APPLICATION

This application claims priority to PCT Patent Application No. PCT/CN2021/089537, filed Apr. 25, 2021, and entitled "METHODS, APPARATUSES, AND COMPUTER READABLE MEDIA FOR CONTROLLING MESSAGE TRANSMISSIONS IN INTEGRATED ACCESS AND BACKHAUL NETWORK", which is incorporated herein by reference in its entirety.

TECHNICAL FIELD

Various embodiments relate to methods, apparatuses, and computer readable media for controlling message transmissions in an integrated access and backhaul network.

BACKGROUND

An integrated access and backhaul (IAB) network, where a part of radio resources is also used for wireless backhauling, has been introduced in a telecommunication system such as a new radio (NR or 5G) system, so that, for example, flexible and dense deployments of NR cells may be enabled without densifying the transport network proportionately and the site acquisition costs and fiber deployment costs may be reduced.

SUMMARY

In a first aspect, disclosed is a method which may be performed for example in a donor central unit in an integrated access and backhaul network. The method includes: determining at least one configuration for controlling a transmission of at least one first radio resource control message from a node to a child node of the node in the integrated access and backhaul network; and transmitting a message including the at least one configuration to the node.

In some example embodiments, the at least one configuration comprises at least one of: the at least one first radio resource control message; a condition for enabling the node to transmit one of the at least one first radio resource control message to the child node; and a condition for enabling the node to discard the at least one first radio resource control message.

In some example embodiments, the condition for enabling the node to transmit one of the at least one first radio resource control message comprises information associated with at least one of: at least one identity associated with the at least one first radio resource control message; at least one first cell or node for enabling the node to transmit one of the at least one first radio resource control message to the child node in a case where a cell or node that the node connects with after migration belongs to the at least one first cell or node; and at least one first donor distributed unit in the integrated access and backhaul network for enabling the node to transmit one of the at least one first radio resource control message to the child node in a case where a donor distributed unit that the node connects with after migration belongs to the at least one first donor distributed unit.

In some example embodiments, an identity of the at least one identity comprises at least one of: an index number of a first radio resource control message among the at least one first radio resource control message; at least one identifier or address of at least one donor distributed unit in the integrated access and backhaul network; at least one identifier or address of at least one ancestor node of the node in the integrated access and backhaul network; and at least one identifier of at least one cell of the at least one ancestor node in the integrated access and backhaul network.

In some example embodiments, the condition for enabling the node to discard the at least one first radio resource control message comprises information associated with at least one of: at least one second cell or node for enabling the node to discard the at least one first radio resource control message to the child node in a case where a cell or node that the node connects with after migration belongs to the at least one second cell or node; at least one second donor distributed unit in the integrated access and backhaul network for enabling the node to discard the at least one first radio resource control message to the child node in a case where a donor distributed unit that the node connects with after migration belongs to the at least one second donor distributed unit; at least one third cell or node for enabling the node to discard the at least one first radio resource control message to the child node in a case where a cell or node that the node connects with after migration does not belong to the at least one third cell or node; at least one third donor distributed unit in the integrated access and backhaul network for enabling the node to discard the at least one first radio resource control message to the child node in a case where a donor distributed unit that the node connects with after migration does not belong to the at least one third donor distributed unit; and an indication for the node to discard the at least one first radio resource control message.

In some example embodiments, the at least one configuration comprises a first list of radio resource control messages for the child node of the node, and the method further comprises: transmitting, by the donor central unit to the child node of the node, a message including at least one another configuration for the child node of the node, the at least one another configuration including a second list of radio resource messages for a child node of the child node of the node and a radio resource control message in the first list including an identity associated with a radio resource control message in the second list.

In a second aspect, disclosed is an apparatus which may be configured to perform at least the method in the first aspect and may be at least a part of a donor central unit in an integrated access and backhaul network. The apparatus may include at least one processor and at least one memory. The at least one memory may include computer program code, and the at least one memory and the computer program code may be configured to, with the at least one processor, cause the apparatus to perform: determining at least one configuration for controlling a transmission of at least one first radio resource control message from a node to a child node of the node in the integrated access and backhaul network; and transmitting a message including the at least one configuration to the node.

In some example embodiments, the at least one configuration comprises at least one of: the at least one first radio resource control message; a condition for enabling the node to transmit one of the at least one first radio resource control message to the child node; and a condition for enabling the node to discard the at least one first radio resource control message.

In some example embodiments, the condition for enabling the node to transmit one of the at least one first radio resource control message comprises information associated with at least one of: at least one identity associated with the at least one first radio resource control message; at least one first cell or node for enabling the node to transmit one of the at least one first radio resource control message to the child node in a case where a cell or node that the node connects with after migration belongs to the at least one first cell or node; and at least one first donor distributed unit in the integrated access and backhaul network for enabling the node to transmit one of the at least one first radio resource control message to the child node in a case where a donor distributed unit that the node connects with after migration belongs to the at least one first donor distributed unit.

In some example embodiments, an identity of the at least one identity comprises at least one of: an index number of a first radio resource control message among the at least one first radio resource control message; at least one identifier or address of at least one donor distributed unit in the integrated access and backhaul network; at least one identifier or address of at least one ancestor node of the node in the integrated access and backhaul network; and at least one identifier of at least one cell of the at least one ancestor node in the integrated access and backhaul network.

In some example embodiments, the condition for enabling the node to discard the at least one first radio resource control message comprises information associated with at least one of: at least one second cell or node for enabling the node to discard the at least one first radio resource control message to the child node in a case where a cell or node that the node connects with after migration belongs to the at least one second cell or node; at least one second donor distributed unit in the integrated access and backhaul network for enabling the node to discard the at least one first radio resource control message to the child node in a case where a donor distributed unit that the node connects with after migration belongs to the at least one second donor distributed unit; at least one third cell or node for enabling the node to discard the at least one first radio resource control message to the child node in a case where a cell or node that the node connects with after migration does not belong to the at least one third cell or node; at least one third donor distributed unit in the integrated access and backhaul network for enabling the node to discard the at least one first radio resource control message to the child node in a case where a donor distributed unit that the node connects with after migration does not belong to the at least one third donor distributed unit; and an indication for the node to discard the at least one first radio resource control message.

In some example embodiments, the at least one configuration comprises a first list of radio resource control messages for the child node of the node, and the at least one memory and the computer program code are configured to, with the at least one processor, cause the apparatus to further perform: transmitting, by the donor central unit to the child node of the node, a message including at least one another configuration for the child node of the node, the at least one another configuration including a second list of radio resource messages for a child node of the child node of the node and a radio resource control message in the first list including an identity associated with a radio resource control message in the second list.

In a third aspect, disclosed is an apparatus which may be configured to perform at least the method in the first aspect and may be at least a part of a donor central unit in an integrated access and backhaul network. The apparatus may include: means for determining at least one configuration for controlling a transmission of at least one first radio resource control message from a node to a child node of the node in the integrated access and backhaul network; and means for transmitting a message including the at least one configuration to the node.

In some example embodiments, the at least one configuration comprises at least one of: the at least one first radio resource control message; a condition for enabling the node to transmit one of the at least one first radio resource control message to the child node; and a condition for enabling the node to discard the at least one first radio resource control message.

In some example embodiments, the condition for enabling the node to transmit one of the at least one first radio resource control message comprises information associated with at least one of: at least one identity associated with the at least one first radio resource control message; at least one first cell or node for enabling the node to transmit one of the at least one first radio resource control message to the child node in a case where a cell or node that the node connects with after migration belongs to the at least one first cell or node; and at least one first donor distributed unit in the integrated access and backhaul network for enabling the node to transmit one of the at least one first radio resource control message to the child node in a case where a donor distributed unit that the node connects with after migration belongs to the at least one first donor distributed unit.

In some example embodiments, an identity of the at least one identity comprises at least one of: an index number of a first radio resource control message among the at least one first radio resource control message; at least one identifier or address of at least one donor distributed unit in the integrated access and backhaul network; at least one identifier or address of at least one ancestor node of the node in the integrated access and backhaul network; and at least one identifier of at least one cell of the at least one ancestor node in the integrated access and backhaul network.

In some example embodiments, the condition for enabling the node to discard the at least one first radio resource control message comprises information associated with at least one of: at least one second cell or node for enabling the node to discard the at least one first radio resource control message to the child node in a case where a cell or node that the node connects with after migration belongs to the at least one second cell or node; at least one second donor distributed unit in the integrated access and backhaul network for enabling the node to discard the at least one first radio resource control message to the child node in a case where a donor distributed unit that the node connects with after migration belongs to the at least one second donor distributed unit; at least one third cell or node for enabling the node to discard the at least one first radio resource control message to the child node in a case where a cell or node that the node connects with after migration does not belong to the at least one third cell or node; at least one third donor distributed unit in the integrated access and backhaul network for enabling the node to discard the at least one first radio resource control message to the child node in a case where a donor distributed unit that the node connects with after migration does not belong to the at least one third donor distributed unit; and an indication for the node to discard the at least one first radio resource control message.

In some example embodiments, the at least one configuration comprises a first list of radio resource control messages for the child node of the node, and the apparatus further comprises: means for transmitting, by the donor central unit to the child node of the node, a message including at least one another configuration for the child node of the node, the at least one another configuration including a second list of radio resource messages for a child node of the child node of the node and a radio resource control message in the first list including an identity associated with a radio resource control message in the second list.

In a fourth aspect, a computer readable medium is disclosed. The computer readable medium may include instructions stored thereon for causing an apparatus as at least a part of a donor central unit in an integrated access and backhaul network to perform the method in the first aspect. The instructions may cause the apparatus to perform: determining at least one configuration for controlling a transmission of at least one first radio resource control message from a node to a child node of the node in the integrated access and backhaul network; and transmitting a message including the at least one configuration to the node.

In some example embodiments, the at least one configuration comprises at least one of: the at least one first radio resource control message; a condition for enabling the node to transmit one of the at least one first radio resource control message to the child node; and a condition for enabling the node to discard the at least one first radio resource control message.

In some example embodiments, the condition for enabling the node to transmit one of the at least one first radio resource control message comprises information associated with at least one of: at least one identity associated with the at least one first radio resource control message; at least one first cell or node for enabling the node to transmit one of the at least one first radio resource control message to the child node in a case where a cell or node that the node connects with after migration belongs to the at least one first cell or node; and at least one first donor distributed unit in the integrated access and backhaul network for enabling the node to transmit one of the at least one first radio resource control message to the child node in a case where a donor distributed unit that the node connects with after migration belongs to the at least one first donor distributed unit.

In some example embodiments, an identity of the at least one identity comprises at least one of: an index number of a first radio resource control message among the at least one first radio resource control message; at least one identifier or address of at least one donor distributed unit in the integrated access and backhaul network; at least one identifier or address of at least one ancestor node of the node in the integrated access and backhaul network; and at least one identifier of at least one cell of the at least one ancestor node in the integrated access and backhaul network.

In some example embodiments, the condition for enabling the node to discard the at least one first radio resource control message comprises information associated with at least one of: at least one second cell or node for enabling the node to discard the at least one first radio resource control message to the child node in a case where a cell or node that the node connects with after migration belongs to the at least one second cell or node; at least one second donor distributed unit in the integrated access and backhaul network for enabling the node to discard the at least one first radio resource control message to the child node in a case where a donor distributed unit that the node connects with after migration belongs to the at least one second donor distributed unit; at least one third cell or node for enabling the node to discard the at least one first radio resource control message to the child node in a case where a cell or node that the node connects with after migration does not belong to the at least one third cell or node; at least one third donor distributed unit in the integrated access and backhaul network for enabling the node to discard the at least one first radio resource control message to the child node in a case where a donor distributed unit that the node connects with after migration does not belong to the at least one third donor distributed unit; and an indication for the node to discard the at least one first radio resource control message.

In some example embodiments, the at least one configuration comprises a first list of radio resource control messages for the child node of the node, and the instructions cause the apparatus to further perform: transmitting, by the donor central unit to the child node of the node, a message including at least one another configuration for the child node of the node, the at least one another configuration including a second list of radio resource messages for a child node of the child node of the node and a radio resource control message in the first list including an identity associated with a radio resource control message in the second list.

In a fifth aspect, disclosed is a method which may be performed for example in a node in an integrated access and backhaul network. The method includes: receiving, from a donor central unit in the integrated access and backhaul network, a message including at least one configuration for the node to control a transmission of at least one radio resource control message to a child node of the node in the integrated access and backhaul network; and controlling the transmission of the at least one radio resource control message based on the at least one configuration.

In some example embodiments, the at least one configuration comprises at least one of: the at least one radio resource control message; a condition for enabling the node to transmit one of the at least one radio resource control message to the child node; and a condition for enabling the node to discard the at least one radio resource control message.

In some example embodiments, the condition for enabling the node to transmit one of the at least one radio resource control message comprises information associated with at least one of: at least one identity associated with the at least one radio resource control message; at least one first cell or node for enabling the node to transmit one of the at least one radio resource control message to the child node in a case where a cell or node that the node connects with after migration belongs to the at least one first cell or node; and at least one first donor distributed unit in the integrated access and backhaul network for enabling the node to transmit one of the at least one radio resource control message to the child node in a case where a donor distributed unit that the node connects with after migration belongs to the at least one first donor distributed unit.

In some example embodiments, an identity of the at least one identity comprises at least one of: an index number of a radio resource control message among the at least one radio resource control message; at least one identifier or address of at least one donor distributed unit in the integrated access and backhaul network; at least one identifier or address of at least one ancestor node of the node in the integrated access and backhaul network; and at least one identifier of at least one cell of the at least one ancestor node in the integrated access and backhaul network.

In some example embodiments, the condition for enabling the node to discard the at least one radio resource control message comprises information associated with at least one of: at least one second cell or node for enabling the node to discard the at least one radio resource control message to the child node in a case where a cell or node that the node connects with after migration belongs to the at least one second cell or node; at least one second donor distributed unit in the integrated access and backhaul network for enabling the node to discard the at least one radio resource control message to the child node in a case where a donor distributed unit that the node connects with after migration belongs to the at least one second donor distributed unit; at least one third cell or node for enabling the node to discard the at least one radio resource control message to the child node in a case where a cell or node that the node connects with after migration does not belong to the at least one third cell or node; at least one third donor distributed unit in the integrated access and backhaul network for enabling the node to discard the at least one radio resource control message to the child node in a case where a donor distributed unit that the node connects with after migration does not belong to the at least one third donor distributed unit; and an indication for the node to discard the at least one radio resource control message.

In some example embodiments, the controlling comprises: discarding the at least one radio resource control message based on the at least one configuration.

In some example embodiments, the controlling comprises: determining one of the at least one radio resource control message based on the at least one configuration; and transmitting, to the child node, at least one of the determined radio resource control message and an identity associated with the determined radio resource control message.

In some example embodiments, the controlling comprises: receiving an identity from a parent node of the node in the integrated access and backhaul network; determining one of the at least one radio resource control message based on the identity and the at least one configuration; and transmitting the determined radio resource control message to the child node.

In some example embodiments, the identity from the parent node comprises at least one of: an index number of a radio resource control message from the parent node; an identifier or address of a donor distributed unit in the integrated access and backhaul network; an identifier or address of an ancestor node of the node in the integrated access and backhaul network; and an identifier of a cell of the ancestor node in the integrated access and backhaul network.

In a sixth aspect, disclosed is an apparatus which may be configured to perform at least the method in the fifth aspect and may be at least a part of a node in an integrated access and backhaul network. The apparatus may include at least one processor and at least one memory. The at least one memory may include computer program code, and the at least one memory and the computer program code may be configured to, with the at least one processor, cause the apparatus to perform: receiving, from a donor central unit in the integrated access and backhaul network, a message including at least one configuration for the node to control a transmission of at least one radio resource control message to a child node of the node in the integrated access and backhaul network; and controlling the transmission of the at least one radio resource control message based on the at least one configuration.

In some example embodiments, the at least one configuration comprises at least one of: the at least one radio resource control message; a condition for enabling the node to transmit one of the at least one radio resource control message to the child node; and a condition for enabling the node to discard the at least one radio resource control message. In some example embodiments, the condition for enabling the node to transmit one of the at least one radio resource control message comprises information associated with at least one of: at least one identity associated with the at least one radio resource control message; at least one first cell or node for enabling the node to transmit one of the at least one radio resource control message to the child node in a case where a cell or node that the node connects with after migration belongs to the at least one first cell or node; and at least one first donor distributed unit in the integrated access and backhaul network for enabling the node to transmit one of the at least one radio resource control message to the child node in a case where a donor distributed unit that the node connects with after migration belongs to the at least one first donor distributed unit.

In some example embodiments, an identity of the at least one identity comprises at least one of: an index number of a radio resource control message among the at least one radio resource control message; at least one identifier or address of at least one donor distributed unit in the integrated access and backhaul network; at least one identifier or address of at least one ancestor node of the node in the integrated access and backhaul network; and at least one identifier of at least one cell of the at least one ancestor node in the integrated access and backhaul network.

In some example embodiments, the condition for enabling the node to discard the at least one radio resource control message comprises information associated with at least one of: at least one second cell or node for enabling the node to discard the at least one radio resource control message to the child node in a case where a cell or node that the node connects with after migration belongs to the at least one second cell or node; at least one second donor distributed unit in the integrated access and backhaul network for enabling the node to discard the at least one radio resource control message to the child node in a case where a donor distributed unit that the node connects with after migration belongs to the at least one second donor distributed unit; at least one third cell or node for enabling the node to discard the at least one radio resource control message to the child node in a case where a cell or node that the node connects with after migration does not belong to the at least one third cell or node; at least one third donor distributed unit in the integrated access and backhaul network for enabling the node to discard the at least one radio resource control message to the child node in a case where a donor distributed unit that the node connects with after migration does not belong to the at least one third donor distributed unit; and an indication for the node to discard the at least one radio resource control message.

In some example embodiments, the controlling comprises: discarding the at least one radio resource control message based on the at least one configuration.

In some example embodiments, the controlling comprises: determining one of the at least one radio resource control message based on the at least one configuration; and transmitting, to the child node, at least one of: the determined radio resource control message; and an identity associated with the determined radio resource control message.

In some example embodiments, the controlling comprises: receiving an identity from a parent node of the node in the integrated access and backhaul network; determining one of the at least one radio resource control message based on the identity and the at least one configuration; and transmitting the determined radio resource control message to the child node.

In some example embodiments, the identity from the parent node comprises at least one of: an index number of a radio resource control message from the parent node; an identifier or address of a donor distributed unit in the integrated access and backhaul network; an identifier or address of an ancestor node of the node in the integrated access and backhaul network; and an identifier of a cell of the ancestor node in the integrated access and backhaul network.

In a seventh aspect, disclosed is an apparatus which may be configured to perform at least the method in the fifth aspect and may be at least a part of a node in an integrated access and backhaul network. The apparatus may include: means for receiving, from a donor central unit in the integrated access and backhaul network, a message including at least one configuration for the node to control a transmission of at least one radio resource control message to a child node of the node in the integrated access and backhaul network; and means for controlling the transmission of the at least one radio resource control message based on the at least one configuration.

In some example embodiments, the at least one configuration comprises at least one of: the at least one radio resource control message; a condition for enabling the node to transmit one of the at least one radio resource control message to the child node; and a condition for enabling the node to discard the at least one radio resource control message.

In some example embodiments, the condition for enabling the node to transmit one of the at least one radio resource control message comprises information associated with at least one of: at least one identity associated with the at least one radio resource control message; at least one first cell or node for enabling the node to transmit one of the at least one radio resource control message to the child node in a case where a cell or node that the node connects with after migration belongs to the at least one first cell or node; and at least one first donor distributed unit in the integrated access and backhaul network for enabling the node to transmit one of the at least one radio resource control message to the child node in a case where a donor distributed unit that the node connects with after migration belongs to the at least one first donor distributed unit.

In some example embodiments, an identity of the at least one identity comprises at least one of: an index number of a radio resource control message among the at least one radio resource control message; at least one identifier or address of at least one donor distributed unit in the integrated access and backhaul network; at least one identifier or address of at least one ancestor node of the node in the integrated access and backhaul network; and at least one identifier of at least one cell of the at least one ancestor node in the integrated access and backhaul network.

In some example embodiments, the condition for enabling the node to discard the at least one radio resource control message comprises information associated with at least one of: at least one second cell or node for enabling the node to discard the at least one radio resource control message to the child node in a case where a cell or node that the node connects with after migration belongs to the at least one second cell or node; at least one second donor distributed unit in the integrated access and backhaul network for enabling the node to discard the at least one radio resource control message to the child node in a case where a donor distributed unit that the node connects with after migration belongs to the at least one second donor distributed unit; at least one third cell or node for enabling the node to discard the at least one radio resource control message to the child node in a case where a cell or node that the node connects with after migration does not belong to the at least one third cell or node; at least one third donor distributed unit in the integrated access and backhaul network for enabling the node to discard the at least one radio resource control message to the child node in a case where a donor distributed unit that the node connects with after migration does not belong to the at least one third donor distributed unit; and an indication for the node to discard the at least one radio resource control message.

In some example embodiments, the controlling comprises: discarding the at least one radio resource control message based on the at least one configuration.

In some example embodiments, the controlling comprises: determining one of the at least one radio resource control message based on the at least one configuration; and transmitting, to the child node, at least one of: the determined radio resource control message; and an identity associated with the determined radio resource control message.

In some example embodiments, the controlling comprises: receiving an identity from a parent node of the node in the integrated access and backhaul network; determining one of the at least one radio resource control message based on the identity and the at least one configuration; and transmitting the determined radio resource control message to the child node.

In some example embodiments, the identity from the parent node comprises at least one of: an index number of a radio resource control message from the parent node; an identifier or address of a donor distributed unit in the integrated access and backhaul network; an identifier or address of an ancestor node of the node in the integrated access and backhaul network; and an identifier of a cell of the ancestor node in the integrated access and backhaul network.

In an eighth aspect, a computer readable medium is disclosed. The computer readable medium may include instructions stored thereon for causing an apparatus as at least a part of a node in an integrated access and backhaul network to perform the method in the fifth aspect. The instructions may cause the apparatus to perform: receiving, from a donor central unit in the integrated access and backhaul network, a message including at least one configuration for the node to control a transmission of at least one radio resource control message to a child node of the node in the integrated access and backhaul network; and controlling the transmission of the at least one radio resource control message based on the at least one configuration.

In some example embodiments, the at least one configuration comprises at least one of: the at least one radio resource control message; a condition for enabling the node to transmit one of the at least one radio resource control message to the child node; and a condition for enabling the node to discard the at least one radio resource control message.

In some example embodiments, the condition for enabling the node to transmit one of the at least one radio resource control message comprises information associated with at least one of: at least one identity associated with the at least one radio resource control message; at least one first cell or node for enabling the node to transmit one of the at least one radio resource control message to the child node in a case where a cell or node that the node connects with after migration belongs to the at least one first cell or node; and at least one first donor distributed unit in the integrated access and backhaul network for enabling the node to transmit one of the at least one radio resource control message to the child node in a case where a donor distributed unit that the node connects with after migration belongs to the at least one first donor distributed unit.

In some example embodiments, an identity of the at least one identity comprises at least one of: an index number of a radio resource control message among the at least one radio resource control message; at least one identifier or address of at least one donor distributed unit in the integrated access and backhaul network; at least one identifier or address of at least one ancestor node of the node in the integrated access and backhaul network; and at least one identifier of at least one cell of the at least one ancestor node in the integrated access and backhaul network.

In some example embodiments, the condition for enabling the node to discard the at least one radio resource control message comprises information associated with at least one of: at least one second cell or node for enabling the node to discard the at least one radio resource control message to the child node in a case where a cell or node that the node connects with after migration belongs to the at least one second cell or node; at least one second donor distributed unit in the integrated access and backhaul network for enabling the node to discard the at least one radio resource control message to the child node in a case where a donor distributed unit that the node connects with after migration belongs to the at least one second donor distributed unit; at least one third cell or node for enabling the node to discard the at least one radio resource control message to the child node in a case where a cell or node that the node connects with after migration does not belong to the at least one third cell or node; at least one third donor distributed unit in the integrated access and backhaul network for enabling the node to discard the at least one radio resource control message to the child node in a case where a donor distributed unit that the node connects with after migration does not belong to the at least one third donor distributed unit; and an indication for the node to discard the at least one radio resource control message.

In some example embodiments, the controlling comprises: discarding the at least one radio resource control message based on the at least one configuration.

In some example embodiments, the controlling comprises: determining one of the at least one radio resource control message based on the at least one configuration; and transmitting, to the child node, at least one of: the determined radio resource control message; and an identity associated with the determined radio resource control message.

In some example embodiments, the controlling comprises: receiving an identity from a parent node of the node in the integrated access and backhaul network; determining one of the at least one radio resource control message based on the identity and the at least one configuration; and transmitting the determined radio resource control message to the child node.

In some example embodiments, the identity from the parent node comprises at least one of: an index number of a radio resource control message from the parent node; an identifier or address of a donor distributed unit in the integrated access and backhaul network; an identifier or address of an ancestor node of the node in the integrated access and backhaul network; and an identifier of a cell of the ancestor node in the integrated access and backhaul network.

BRIEF DESCRIPTION OF THE DRAWINGS

Some embodiments will now be described, by way of non-limiting examples, with reference to the accompanying drawings. Throughout drawings and descriptions, similar to substantially same reference number would intend to refer to similar or substantially same elements, messages, operations, or the like.

DETAILED DESCRIPTION

In an IAB network, a donor base station (also referred to as a donor or an IAB-donor herein) may include a central unit (CU, also referred to as IAB-donor-CU or donor CU herein) and at least one distributed unit (DU, also referred to as IAB-donor-DU or donor DU herein), wherein the donor CU may host radio resource control (RRC), service data adaptation protocol (SDAP), packet data convergence protocol (PDCP), and so on, and a donor DU may host radio link control (RLC), medium access control (MAC), physical (PHY) layers, and so on. Centralized mechanisms at donor CU, which may have an overview of the whole network/path, may be employed for handover decisions, topology change, routing, bearer mapping, and so on. Also, in the IAB network, one or more IAB nodes (also referred to as one or more nodes herein) may be included. An IAB node (also referred to as node herein) may include a mobile termination (IAB-MT) part used to communicate with a parent node (for example, another node serving this node or the donor) in the IAB network, and a DU (IAB-DU) part used to communicate with a child node (for example, another node served by this node) in the IAB network or a user equipment (UE) served by this node. In the IAB network, for a UE (or IAB-MT) connected with a donor DU, a RRC message to the UE is encapsulated in an F1 application protocol (F1AP) message by the donor CU. The donor CU sends the F1AP message including the encapsulated RRC message to the donor DU, and the donor DU may transmit the encapsulated RRC message to the UE; for a UE (or IAB-MT) connected with an IAB node, a RRC message to a UE is encapsulated in an F1 application protocol (F1AP) message by the donor CU. The donor CU send the F1AP message including the encapsulated RRC message to the IAB-DU over the wireless backhaul RLC channel, and the IAB-DU may transmit the encapsulated RRC message to the UE.

A node migration may be an intra donor CU migration or inter donor CU migration in the IAB network. After the migration, a migrating node may connect to a planned target cell, or another parent cell for example when failing to connect with the planned target cell. When the donor DU is changed after the migration, the migrating IAB node and its descendant IAB node(s) (also referred to as descendant node(s) herein) may need new addresses and new default UL routing identifiers for example via RRC messages (for example, RRC reconfiguration messages). In some implementations, the RRC messages are transmitted after the migrating node connects with the target cell and the migration at a transport network layer (TNL) is completed, which for example may cause a long interruption.

Figure 1:
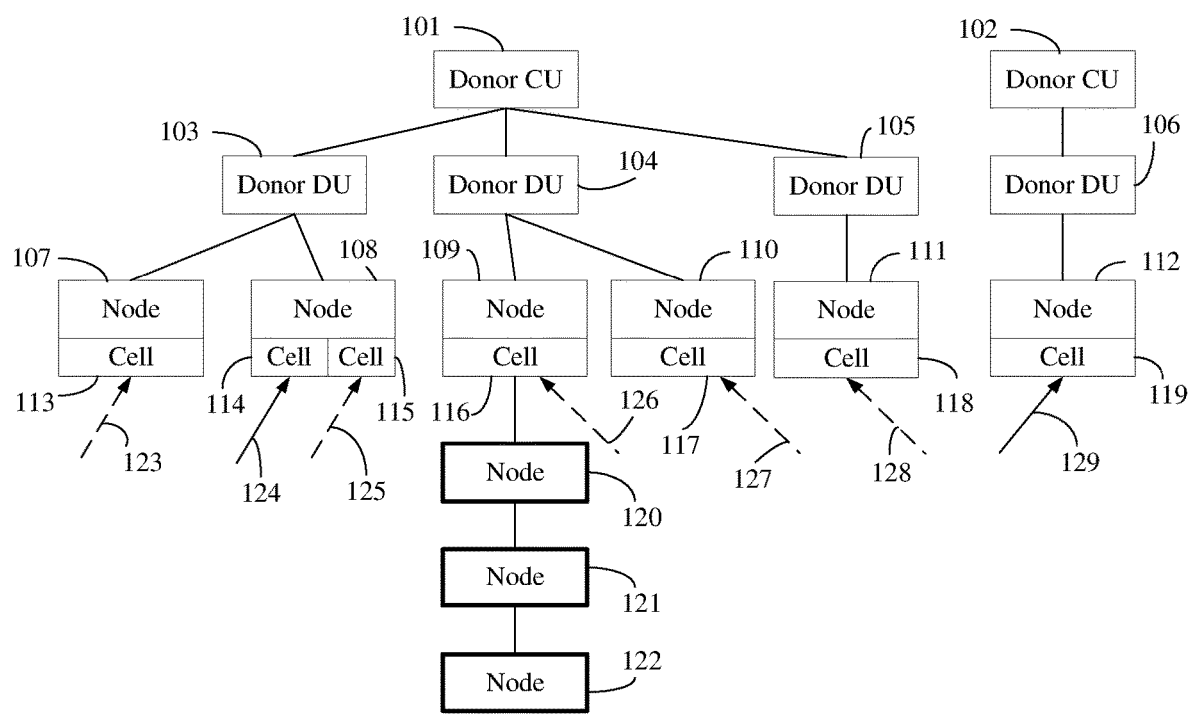
FIG. 1 illustrates an example of a node migration in an IAB network in an example embodiment.

FIG. 1 illustrates an example of a node migration in an IAB network in an example embodiment. A part of an IAB network is illustrated in FIG. 1, where a donor base station may include a donor CU 101 and a plurality of donor DUs 103, 104, and 105, and another donor base station may include a donor CU 102 and a donor DU 106.

As illustrated in FIG. 1, a node 107 associated with a cell 113 and a node 108 associated with cells 114 and 115 are under the donor DU 103, a node 109 associated with a cell 116 and a node 110 associated with a cell 117 are under the donor DU 104, a node 111 associated with a cell 118 is under the donor DU 105, and a node 112 associated with a cell 119 is under the donor DU 106. The node 109 is a source parent node of a node 120, and descendant nodes of the node 120 include a child node 121 and a grandchild node 122, which is also a child node of the node 121. An ancestor node of a node herein may include one or more intermediate nodes between the donor and the node, through which the donor may transmit download messages to the node and the node may transmit uplink messages to the donor. For example, the ancestor node(s) of the node 122 may include the node 121 (a parent node of the node 122), the node 120 (a parent node of the node 121), the node 109 (a parent node of the node 120), and so on. It is appreciated that FIG. 1 only illustrates an example of IAB network for descriptions, and this disclosure is not limited to the IAB network as illustrated in FIG. 1. For example, in various example embodiments, the node 120 may directly connect with the donor DU 104 and there may be no intermediate node(s) between the node 120 and the donor DU 104, and/or there may be one or more another IAB nodes between the node 107 and the donor DU 103, and/or there may be one or more another donor DUs under the donor CU 101, or the like.

For example, as illustrated by an arrow 124 in FIG. 1 (also referred to as case 1 herein), the node 120, together with its descendant nodes (for example, child node 121 and grandchild node 122), may perform a migration while keeping under the donor CU 101 (also referred to as intra-donor-CU migration), with a target donor DU being the donor DU 103, a target parent node being the node 108, and a target cell being the cell 114.

Alternatively, the node 120, together with its descendant nodes (for example, child node 121 and grandchild 122), may actually connect to the cell 115 (not the target cell) of the target node 108, as illustrated by a dotted arrow 125 in FIG. 1 (also referred to as case 2 herein).

Alternatively, the node 120, together with its descendant nodes (for example, child node 121 and grandchild 122), may actually connect to the cell 113 (not the target cell) of the node 107 (not the target parent node) under the target donor DU 103, as illustrated by a dotted arrow 123 (also referred to as case 3 herein).

Alternatively, the node 120, together with its descendant nodes (for example, child node 121 and grandchild 122), may actually still connect to the source cell 116 of the source parent node 109, as illustrated by a dotted arrow 126 in FIG. 1 (also referred to as case 4 herein), or may actually connect to the cell 117 (not the target cell) of the node 110 (not the target parent node) under the source donor DU 104, as illustrated by a dotted arrow 127 in FIG. 1 (also referred to as case 5 herein).

Alternatively, the node 120, together with its descendant nodes (for example, child node 121 and grandchild 122), may actually connect to the cell 118 (not the target cell) of the node 111 (not the target parent node) under the donor DU 105 (not the target donor DU), as illustrated by a dotted arrow 128 in FIG. 1 (also referred to as case 6 herein).

In addition, for example as illustrated by an arrow 129 in FIG. 1 (also referred to as case 7 herein), the node 120, together with its descendant nodes (for example, child node 121 and grandchild 122), may perform a migration between the donor CU 101 and the donor CU 102 (also referred to as inter-donor-CU migration), with a target donor CU being the donor CU 102, a target donor DU being the donor DU 106, a target parent node being the node 112, and a target cell being the cell 119.

Figure 2:
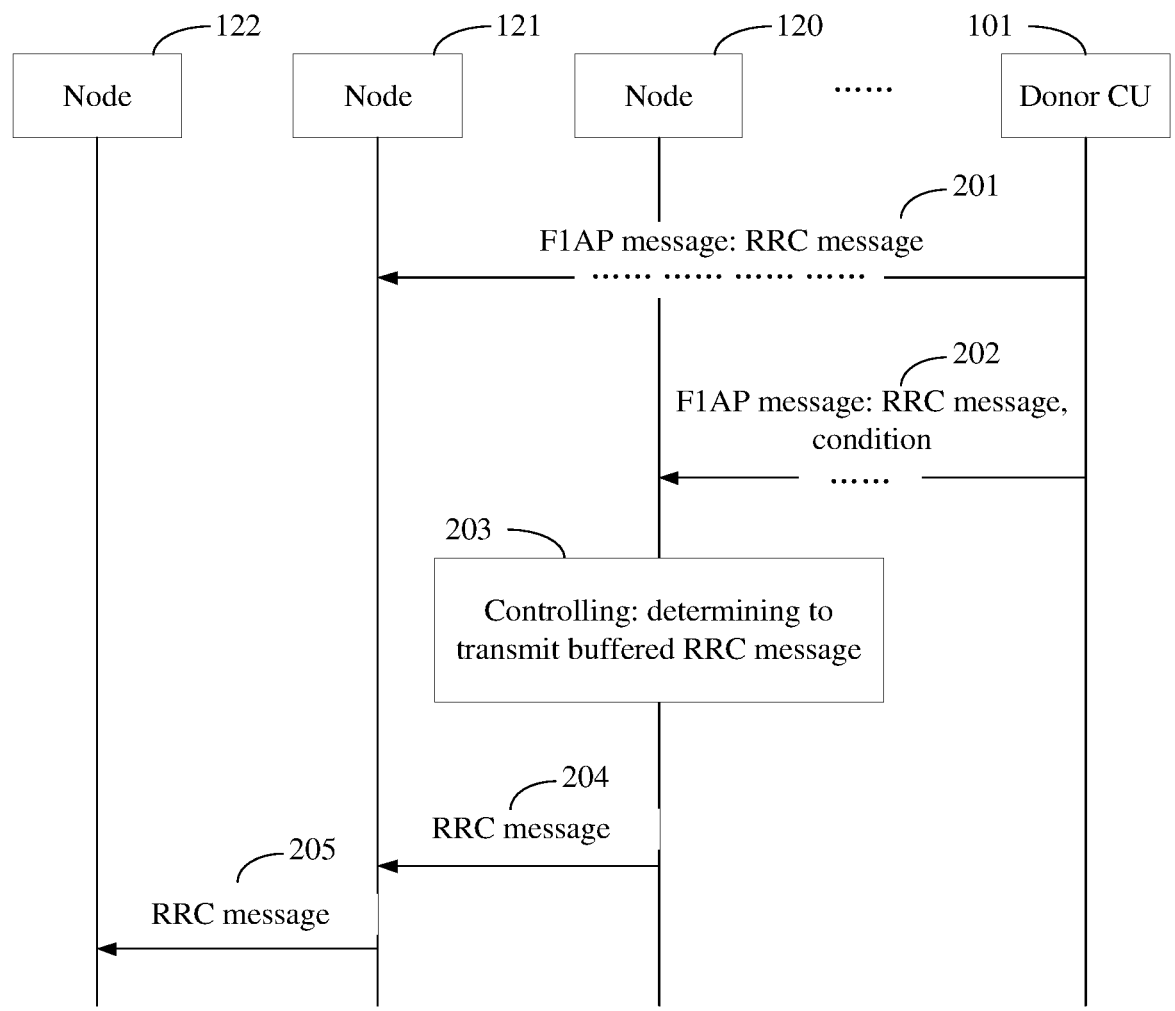
FIG. 2 illustrates an example of a message transmission control in an example embodiment.

FIG. 2 illustrates an example of a message transmission control in an example embodiment.

As illustrated in FIG. 2, for example before or at the beginning of the migration of the node 120, the donor CU 101 may transmit a message 201 (for example an F1AP message) to the node 121. The message 201 may include a configuration for the node 121 to control a transmission of a RRC message (for example, a RRC reconfiguration message) for a child node of the node 121, such as the node 122. As illustrated in FIG. 2, the configuration in the message 201 may include the RRC message for the node 122. When receiving the message 201, the node 121 may buffer the RRC message for the node 122.

It is appreciated that, throughout this disclosure, a transmission or a reception of a message or signaling in an IAB network may be either directly or indirectly. For example, the message 201 may be transmitted by the donor CU 101 to the node 121 indirectly via the donor DU 104 and optionally one or more intermediate IAB nodes (for example, the node 109), and a message between the node 120 and the node 121 may be communicated directly, for example without being forwarded by other nodes in the IAB network. Further, for simplicity and clarity, not all messages or signaling are illustrated in the drawings. For example, a response message from the node 121 to the donor CU 101 after receiving the message 201 is not illustrated in FIG. 2; a response message from the node 121 to the node 120 after receiving the message 204 is not illustrated in FIG. 2.

Also, as illustrated in FIG. 2, for example before or at the beginning of the migration of the node 120, the donor CU 101 may transmit a message 202 (for example, an F1AP message) to the node 120. The message 202 may include a configuration for the node 120 to control a transmission of a RRC message (for example, a RRC reconfiguration message) for a child node of the node 120, such as the node 121.

As illustrated in FIG. 2, the configuration in the message 202 may include at least one of the RRC message for the node 121, and at least one condition for controlling the transmission of the RRC message for the node 121. In another example, the configuration in the message 201 may only include at least one condition for controlling the transmission of the RRC message, without a RRC message for the node 121. When receiving the message 202, the node 120 may buffer the RRC message for the node 121.

In some example embodiments, the configuration in the message 202 may include a first condition so that the node 120 may transmit the buffered RRC message to the node 121 when the first condition is satisfied.

For example, the first condition may include information associated with one or more cells, or one or more nodes, or one or more donor DUs in the IAB network, such as identity(ies) or address(es) of these cells, nodes or donor DUs. For example, the first condition may include identity(ies) of the cells 113, 114, 115, and so on, so that the node 120 transmits the buffered RRC message to the node 121 if the node 120 connects to one of the cells 113, 114, 115 and so on after the migration. In another example, the first condition may include identity(ies) or address(es) of the nodes 107, 108, and so on, so that the node 120 transmits the buffered RRC message to the node 121 if a parent node of the node 120 or an ancestor node of the node 120 after the migration is one of the nodes 107, 108, and so on. In another example, the first condition may include an identity or address of the donor DU 103, so that the node 120 transmits the buffered RRC message to the node 121 if the node 120 is under the donor DU 103 after the migration.

In some example embodiments, the node 120 may discard the buffered RRC message for the node 121, if the node 120 connects to a cell different from those cells specified in the first condition after the migration, or if the parent node of the node 120 or an ancestor node of the node 120 after the migration is different from those nodes specified in the first condition, or the node 120 is not under a donor DU specified in the first condition.

In some example embodiments, in addition to or in lieu of the first condition, the configuration in the message 202 may include a second condition so that the node 120 may discard the buffered RRC message for the node 121 when the second condition is satisfied.

Similar to the first condition, for example, the second condition may also include information associated with one or more cells, or one or more nodes, or one or more donor DUs in the IAB network, such as identity(ies) or address(es) of these cells, nodes or donor DUs. For example, the second condition may include identifiers of the cells 116, 117, and so on, so that the node 120 discards the buffered RRC message for the node 121 if the node 120 connects to one of the cells 116, 117, and so on after the migration. In another example, the second condition may include identity(ies) or address(es) of the nodes 109, 110, and so on, so that the node 120 discards the buffered RRC message for the node 121 if a parent node of the node 120 or an ancestor node of the node 120 after the migration is one of the nodes 109, 110, and so on. In another example, the second condition may include identity(ies) or address(es) of the donor DUs 104, and so on, so that the node 120 discards the buffered RRC message for the node 121 if the node 120 is under one of the donor DUs 104, and so on after the migration.

In some example embodiments, additionally or alternatively, the configuration in the message 202 may include also a third condition so that the node 120 may discard the buffered RRC message for the node 121 and no RRC message is transmitted from the node 120 to the node 121 during or after the migration, when the third condition is satisfied, for example, when the node 120 connected with a cell or node or donor DU other than any cell or node or Donor DU as specified in the third condition after migration.

For example, the third condition may include information associated with one or more cells, or one or more nodes, or one or more donor DUs in the IAB network, such as identity(ies) or address(es) of these cells, nodes or donor DUs. For example, the third condition may include identifiers of the cells 113, 114, 115, and so on, so that the node 120 discards the buffered RRC message for the node 121 and does not transmit RRC message to the node 121 if the node 120 connects to a cell does not belong to cells 113, 114, 115, and so on after the migration. In another example, the third condition may include identity(ies) or address(es) of the nodes 107, 108, and so on, so that the node 120 discards the buffered RRC message for the node 121 and does not transmit RRC message to the node 121 if a parent node of the node 120 or an ancestor node of the node 120 after the migration does not belong to nodes of 107, 108, and so on. In another example, the third condition may include identity(ies) or address(es) of the donor DU 103, and so on, so that the node 120 discards the buffered RRC message for the node 121 and does not transmit RRC message to the node 121 if the node 120 is under a donor DU does not belong to donor DU 103, and so on after the migration. In yet another example, the third condition may only include a discard indication, but not include information associated with cell, or node, or donor DU in the IAB network, so that the node 120 discards the buffered RRC message for the node 121 and does not transmit any RRC message to the node 121, no matter the target parent cell or target parent node or target ancestor node or target donor DU after the migration.

In some example embodiments, additionally or alternatively, the configuration in the message 202 may include also a fourth condition so that the node 120 may discard the buffered RRC message for the node 121 and transmit another RRC message (for example, a new RRC message obtained from the donor CU 101 or 102) to the node 121 during or after the migration when the fourth condition is satisfied.

For example, the fourth condition may include information associated with one or more cells, or one or more nodes, or one or more donor DUs in the IAB network, such as identity(ies) or address(es) of these cells, nodes or donor DUs. For example, the fourth condition may include identifiers of the cells 118, 119, and so on, so that the node 120 discards the buffered RRC message for the node 121 and transmits another RRC message (for example, another RRC message from the donor CU 101 or 102) to the node 121 if the node 120 connects to one of the cells 118, 119 and so on after the migration. In another example, the fourth condition may include identity(ies) or address(es) of the nodes 111, and 112, and so on, so that the node 120 discards the buffered RRC message for the node 121 and transmits another RRC message (for example, another RRC message from the donor CU 101 or 102) to the node 121 if a parent node of the node 120 or an ancestor node of the node 120 after the migration is one of the nodes 111, and 112, and so on. In another example, the fourth condition may include identity(ies) or address(es) of the donor DUs 105, 106, and so on, so that the node 120 discards the buffered RRC message for the node 121 and transmits another RRC message (for example, another RRC message from the donor CU 101 or 102) to the node 121 if the node 120 is under one of the donor DUs 105, 106, and so on after the migration.

For example, in the above case 1 where the node 120 connects to the target cell 114 after the migration, or in the above case 2 where the node 120 connects to the cell 115 (not the target cell) of the target parent node 108, or in the above case 3 where the node 120 connects to the cell 113 (not the target cell) of the node 107 (not the target parent node) under the target donor DU 103, as illustrated in FIG. 2, the node 120 may determine to transmit the buffered RRC message 204 for the node 121 based on the configuration in the received message 202 in an operation 203.

In some example embodiments, as illustrated in FIG. 2, the node 121 may transmit its buffered RRC message 205 for the node 122 to the node 122, for example in response to a reception of the RRC message 204 from the node 120. In some example embodiments, unlike illustrated in FIG. 2, the node 121 may transmit its buffered RRC message 205 for the node 122 to the node 122, for example in response to a reception of information from the node 120. The information of the RRC message 204 may be included in a backhaul adaptation protocol (BAP) protocol data unit (PDU).

For example, the transmissions of the RRC messages 204 and 205 may be performed before a completion of the TNL migration of the node 120 and a completion of the TNL migration of the node 121, so that a service interruption caused by the migration may be avoided or reduced.

Figure 3:
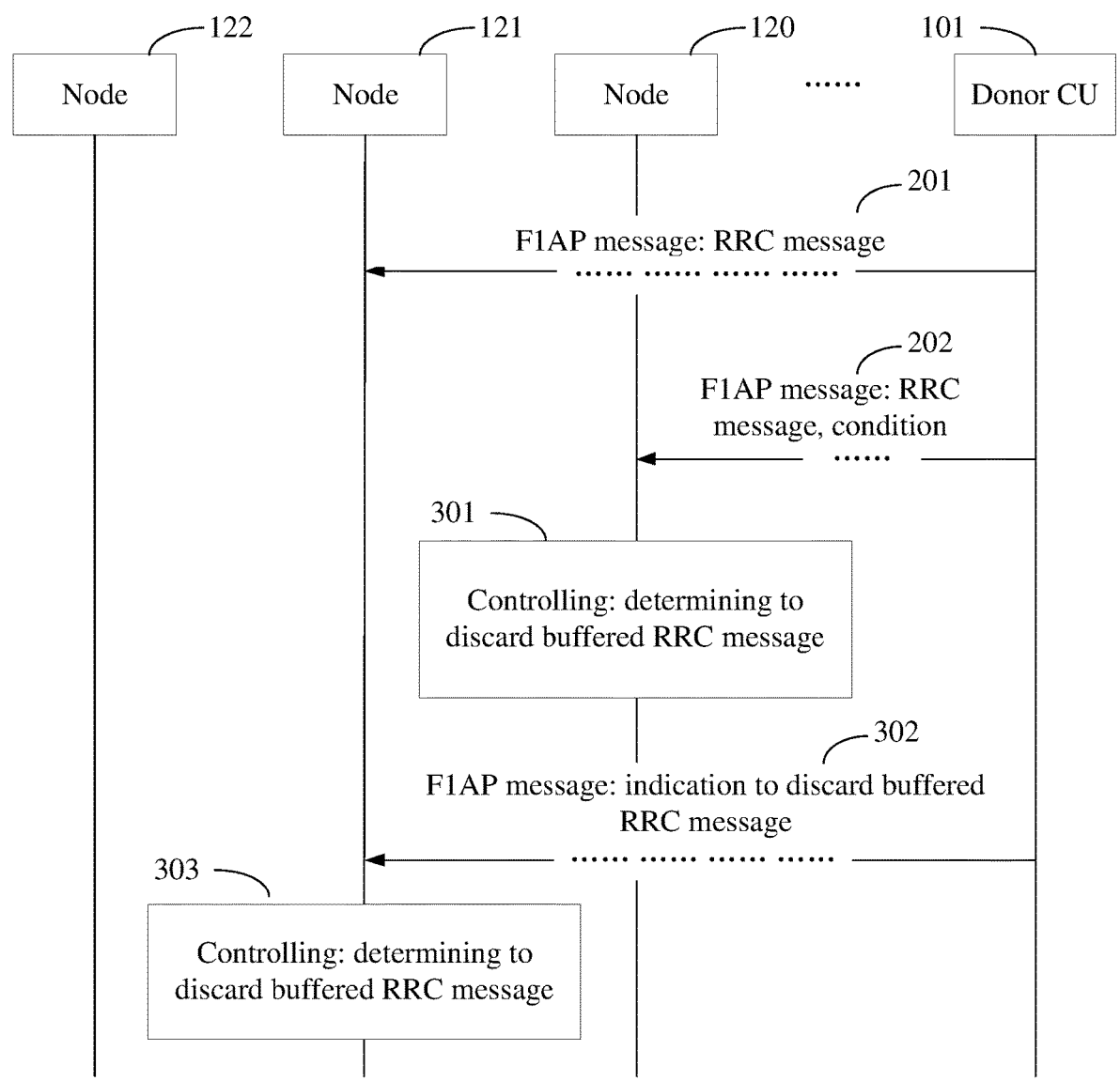
FIG. 3 illustrates an example of a message transmission control in an example embodiment.

For example, in the above case 4 where the node 120 still connects to the source cell 116 of the source parent node 109 after the migration, or in the above case 5 where the node 120 connects to the cell 117 (not the target cell) of the node 110 (not the target parent node) under the source donor DU 104, as illustrated in FIG. 3, the node 120 may determine to discard the buffered RRC message for the node 121 based on the configuration in the received message 202 in an operation 301.

As illustrated in FIG. 3, no RRC message is transmitted from the node 120 to the node 121. Further, the donor CU 101 may initiate a procedure, for example, an F1AP procedure, towards the node 121, to inform the node 121 to discard its buffered RRC message for the node 122, for example by transmitting a message 302 (for example, an F1AP message) to the node 121. For example, the message 302 may include a configuration including information associated with an indication for the node 121 to discard buffered RRC message.

Then, in an operation 303, the node 121 may determine to discard the buffered RRC message for the node 122, based on the configuration in the received message 302. Then, as illustrated in FIG. 3, no RRC message is transmitted from the node 121 to the node 122.

Figure 4:
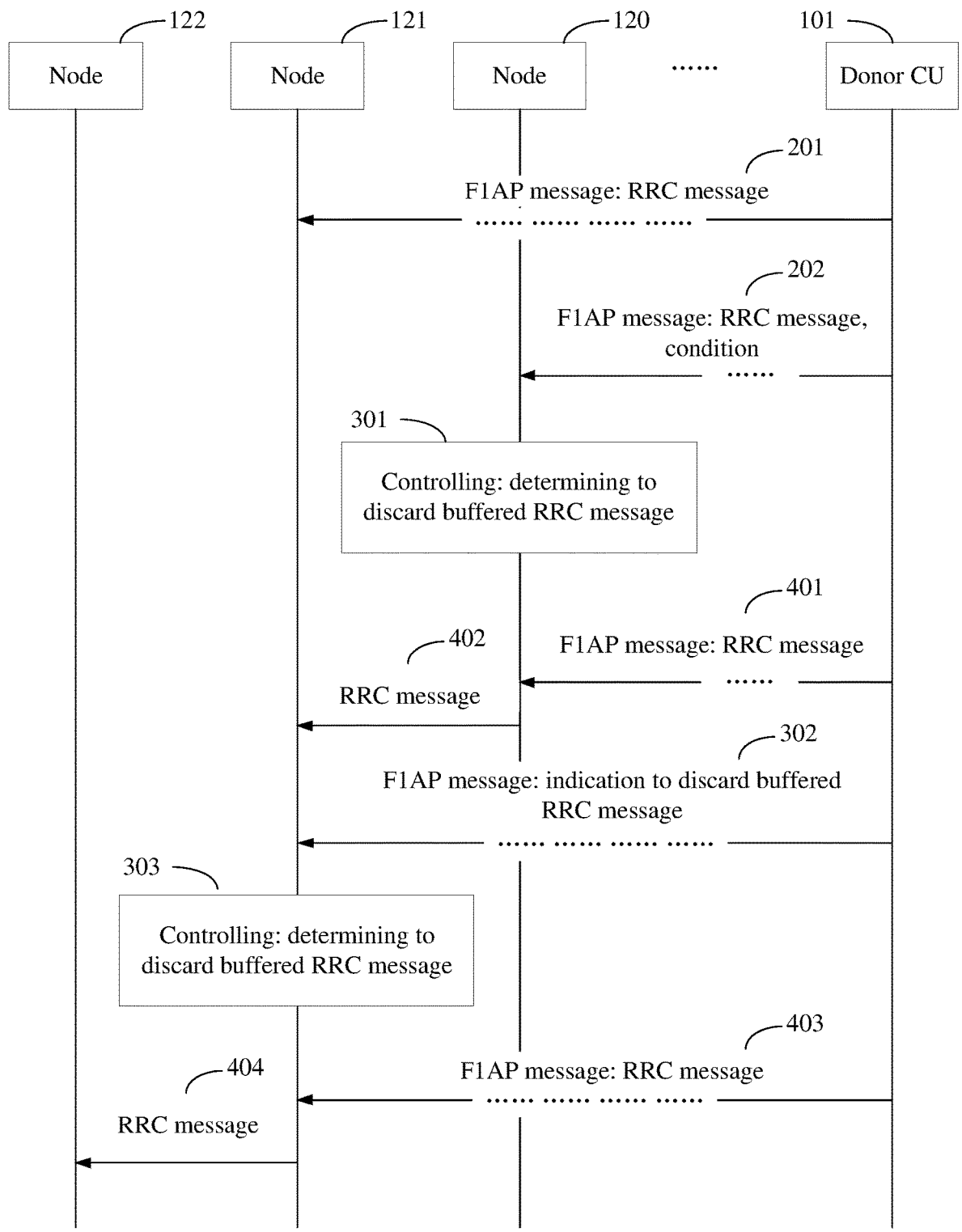
FIG. 4 illustrates an example of a message transmission control in an example embodiment.

For example, in the above case 6 where the node 120 connects to the cell 118 (not the target cell) of the node 111 (not the target parent node) under the donor DU 105 (not the target donor DU), as illustrated in FIG. 4, the node 120 may determine to discard the buffered RRC message for the node 121 in the operation 301 based on the configuration in the received message 202.

As illustrated in FIG. 4, for the case 6, the donor CU 101 may transmit a message 401 (for example, an F1AP message) to the node 120, which includes information associated with a new RRC message 402 for the node 121. For example, the message 401 may be transmitted by the donor CU 101 after a completion of the TNL migration of the node 120. Then, the node 120 may transmit the RRC message 402 to the node 121.

As illustrated in FIG. 4, the donor CU 101 may further initiate an F1AP procedure towards the node 121, to inform the node 121 to discard its buffered RRC message for the node 122, for example by transmitting the message 302 to the node 121. For example, the message 302 may include a configuration including information associated with an indication for the node 121 to discard buffered RRC message. It is appreciated that the transmission of the message 302 may be performed before the transmissions of the messages 401 and 402.

Then, in the operation 303, the node 121 may determine to discard the buffered RRC message for the node 122, based on the configuration in the received message 302.

As illustrated in FIG. 4, the donor CU 101 may further transmit a message 403 (for example, an F1AP message) to the node 121, which includes a configuration including information associated with a new RRC message 404 for the node 122. In some example embodiments, instead of transmitting the message 403 separately, the information associated with the new RRC message 404 for the node 122 may be provided via the message 302, together with the indication for the node 121 to discard the originally buffered RRC message.

Then, the node 121 may transmit the RRC message 404 to the node 122.

Figure 5:
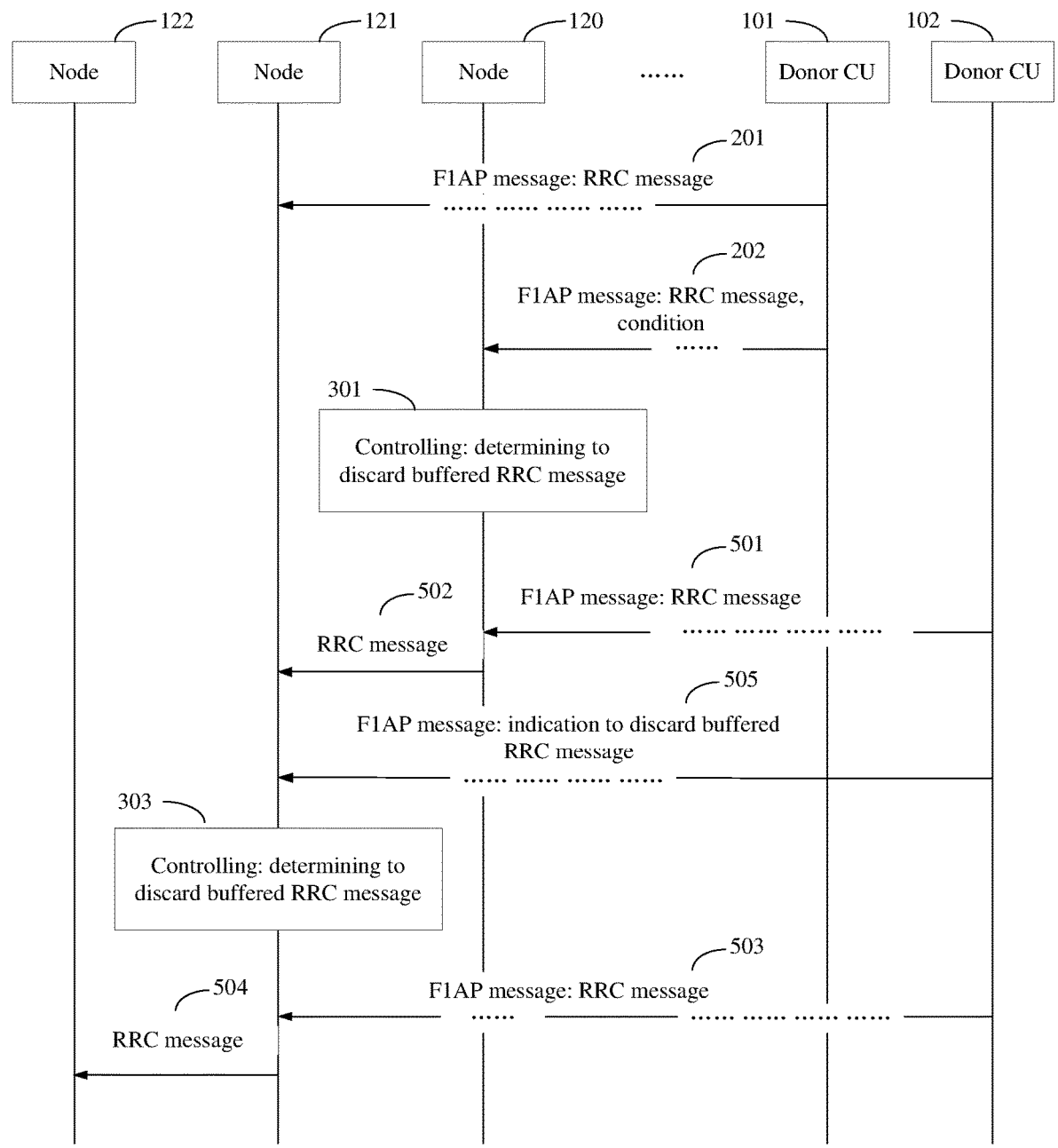
FIG. 5 illustrates an example of a message transmission control in an example embodiment.

For example, in the above case 7 where the node 120 performs a migration between donor CUs and connects to the cell 119 (not the target cell) of the node 112 (not the target parent node) under the donor DU 106 (not the target donor DU) associated with the donor CU 102 after the migration, as illustrated in FIG. 5, the node 120 may determine to discard the buffered RRC message for the node 121 in the operation 301 based on the configuration in the received message 202.

As illustrated in FIG. 5, for the case 7, the donor CU 102 may transmit a message 501 (for example, an F1AP message) to the node 120, which includes information associated with a new RRC message 502 for the node 121. For example, the message 501 may be transmitted by the donor CU 102 after a completion of the TNL migration of the node 120. Then, the node 120 may transmit the RRC message 502 to the node 121.

As illustrated in FIG. 5, the donor CU 102 may further initiate an F1AP procedure towards the node 121, to inform the node 121 to discard its buffered RRC message for the node 122, for example by transmitting a message 505 to the node 121. For example, the message 505 may include a configuration for an indication to discard buffered RRC message. Then, in the operation 303, the node 121 may determine to discard the buffered RRC message for the node 122, based on the configuration in the received message 505.

Further, the donor CU 102 may transmit a message 503 (for example, an F1AP message) to the node 121, which includes a configuration including information associated with a new RRC message 504 for the node 122. Then, the node 121 may transmit the RRC message 504 to the node 122.

In some example methods, the message 505 may also include a configuration including information associated with a new RRC message 504 for the node 122, so that the transmission of the message 503 may be omitted. For example, the message 505 may be transmitted after a completion of the TNL migration of the node 120.

Figure 6A:
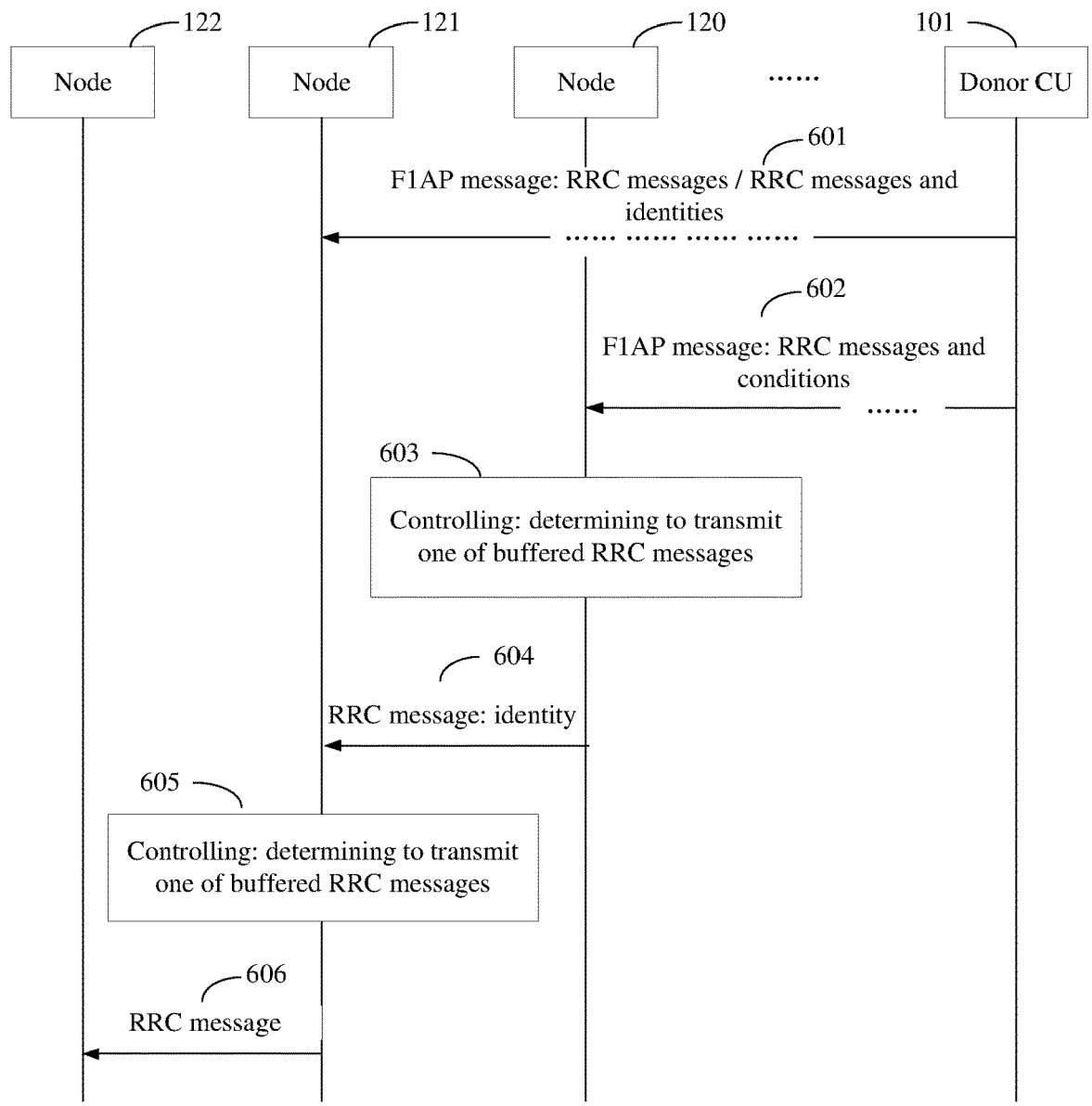
FIG. 6a illustrates an example of a message transmission control in an example embodiment.

FIG. 6a illustrates another example of a message transmission control in an example embodiment.

As illustrated in FIG. 6a, for example before or at the beginning of the migration of the node 120, the donor CU 101 may transmit a message 601 (for example, an F1AP message) to the node 121 to provide the node 121 with a configuration for controlling a transmission of a RRC message (for example, a RRC reconfiguration message) for the node 122, and may transmit a message 602 (for example, an F1AP message) to the node 120 to provide the node 120 with a configuration for controlling a transmission of a RRC message (for example, a RRC reconfiguration message) for the node 121.

Figure 6B:
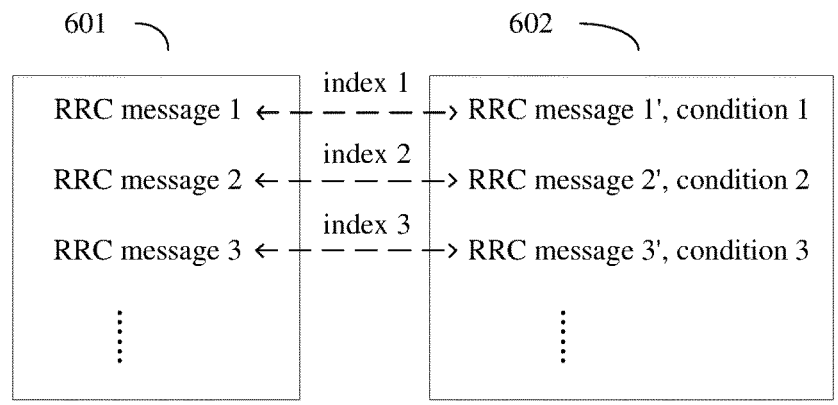
FIG. 6b illustrates an example of information items for controlling message transmission in an example embodiment.

As illustrated in FIG. 6b, in some example embodiments, the configuration in the message 601 may include a plurality of configuration items, where, for example, each configuration item may include a RRC message for the node 122, such as RRC message 1, RRC message 2, RRC message 3, and so on in FIG. 6b.

Each RRC message in the message 601 may be associated with an identity such as an index number. For example, the message 601 may include an identity such as an index number, for each RRC message. For example, as illustrated in FIG. 6b, the RRC message 1 in the message 601 may be associated with an index 1 (for example, the message 601 includes an index 1 for the RRC message 1), the RRC message 2 in the message 601 may be associated with an index 2 (for example, the message 601 includes an index 2 for the RRC message 2), the RRC message 3 in the message 601 may be associated with an index 3 (for example, the message 601 includes an index 3 for the RRC message 3), and so on.

Also, the configuration in the message 602 may include a plurality of configuration items, where each configuration item may include a RRC message for the node 121 and at least one condition for controlling the transmission of the RRC message for the node 121.

For example, as illustrated in FIG. 6b, an configuration item in the message 602 may include a RRC message 1' and a condition 1, another configuration item in the message 602 may include a RRC message 2' and a condition 2, yet another configuration item in the message 602 may include a RRC message 3' and a condition 3, and so on.

Further, each RRC message in the message 602 may also include information associated with an identity such as an index number, so that a corresponding RRC message may be found in the message 601 for each identity such as an index number in the RRC message of the message 602. For example, as illustrated in FIG. 6b, the RRC message 1' in the message 602 may include the index 1, the RRC message 2' in the message 602 may include the index 2, the RRC message 3' in the message 602 may include the index 3, and so on.

Each condition in the message 602 may include information associated with one or more cells, or one or more nodes, or one or more donor DUs in the IAB network, such as identity(ies) or address(es) of these cells, nodes or donor DUs.

For example, the condition 1 may include identifiers of the cells 113, 114, and 115, so that the node 120 transmits the buffered RRC message 1' to the node 121 if the node 120 connects to one of the cells 113, 114, and 115 after the migration; the condition 2 may include an identity of the cell 118, so that the node 120 transmits the buffered RRC message 2' to the node 121 if the node 120 connects to the cell 118 after the migration; the condition 3 may include an identity of the cell 119, so that the node 120 transmits the buffered RRC message 3' to the node 121 if the node 120 connects to the cell 119 after the migration; and so on.

In another example, the condition 1 may include identity(ies) or address(es) of the nodes 107 and 108, so that the node 120 transmits the buffered RRC message 1' to the node 121 if a parent node of the node 120 after the migration is one of the nodes 107 and 108; the condition 2 may include an identity or address of the node 111, so that the node 120 transmits the buffered RRC message 2' to the node 121 if a parent node of the node 120 after the migration is the node 111; the condition 3 may include an identity or address of the node 112, so that the node 120 transmits the buffered RRC message 3' to the node 121 if a parent node of the node 120 after the migration is the node 112; and so on.

In another example, the condition 1 may include an identity or address of the donor DU 103, so that the node 120 transmits the buffered RRC message 1' to the node 121 if the node 120 is under the donor DU 103 after the migration; the condition 2 may include an identity or address of the donor DU 105, so that the node 120 transmits the buffered RRC message 2' to the node 121 if the node 120 is under the donor DU 105 after the migration; the condition 3 may include an identity or address of the donor DU 106, so that the node 120 transmits the buffered RRC message 3' to the node 121 if the node 120 is under the donor DU 106 after the migration; and so on. It is appreciated that message 602 may include one or more condition(s) with any combination of information associated with one or more cells, information associated with one or more nodes, and information associated with one or more donor-DUs.

Then, in an operation 603 as illustrated in FIG. 6a, the node 120 may determine whether one of the conditions obtained through the message 602 (for example, including the condition 1, the condition 2, and so on) is satisfied. If one of the conditions is satisfied, the node 120 may determine to transmit, to the node 121 in the operation 603, a buffered RRC message 604 corresponding to the satisfied condition.

Further, when receiving the RRC message 604, in an operation 605, the node 121 may use the identity included in the RRC message 604, for example the index number in the received RRC message 604, to determine one of the buffered RRC messages for the node 122, and may transmit the determined RRC message 606 to the node 122.

For example, in the above case 1 or 2 or 3, in the operation 603, the node 120 may determine that the condition 1 is satisfied, and may determine to transmit the RRC message 1' to the node 121 based on the condition 1. The RRC message 604 from the node 120 to the node 121 may be the RRC message 1' including identity information associated with the index 1 (for example, the RRC message 1' includes the index 1). When receiving the RRC message 604, in the operation 605, the node 121 may use the identity information (for example, the index 1) in the received RRC message 604 to determine one of the buffered RRC message is associated with the identity (for example, the RRC message 1 is associated with the index 1). The node 121 may transmit the RRC message 606, which is the determined RRC message 1 from the node 121 to the node 122.

For example, in the above case 6, in the operation 603, the node 120 may determine that the condition 2 is satisfied, and may determine to transmit the RRC message 2' to the node 121 based on the condition 2. The RRC message 604 from the node 120 to the node 121 may be the RRC message 2' including identity information associated with the index 2 (for example, the RRC message 2' includes the index 2). When receiving the RRC message 604, in the operation 605, the node 121 may use the identity information (for example, the index 2) in the received RRC message 604 to determine one of the buffered RRC message is associated with the identity (for example, the RRC message 2 is associated with the index 2). The node 121 may transmit the RRC message 606, which is the determined RRC message 2 from the node 121 to the node 122.

Figure 6C:
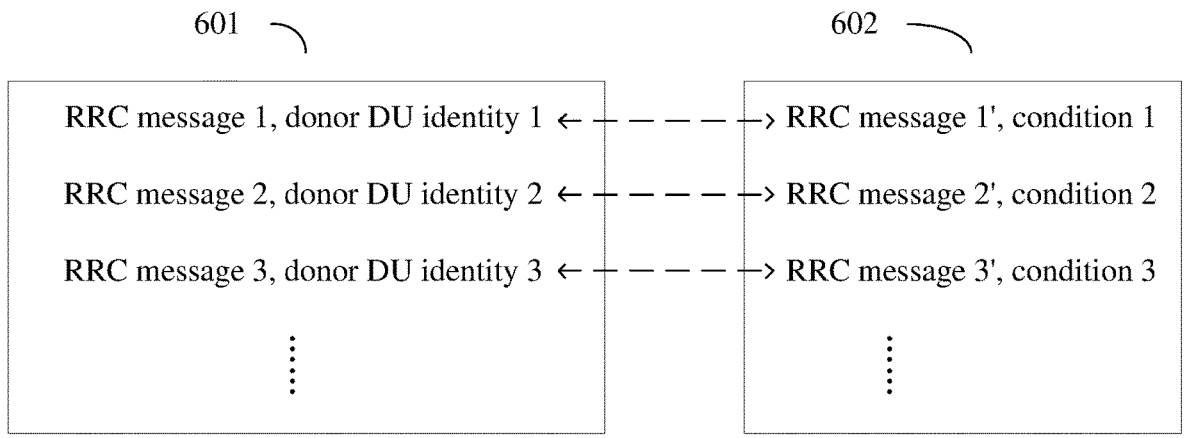
FIG. 6c illustrates an example of information items for controlling message transmission in an example embodiment.

In some example embodiments, as illustrated in FIG. 6c, the configuration in the message 601 may also include a plurality of configuration items, where each configuration item may include a RRC message for the node 122 and an associated identity such as an associated donor DU identity. For example, an configuration item in the message 601 may include the RRC message 1 and a donor DU identity 1 for donor DU 103, another configuration item in the message 601 may include the RRC message 2 and a donor DU identity 2 for donor DU 105, yet another configuration item in the message 601 may include the RRC message 3 and a donor DU identity 3 for donor DU 106, and so on. Each RRC message in the message 602 may include an identity associated with a donor DU identity. For example, the RRC message 1' in the message 602 may include a donor DU identity 1, the RRC message 2' in the message 602 may include a donor DU identity 2, the RRC message 3' in the message 602 may include a donor DU identity 3, and so on. In the example as illustrated in FIG. 6c, a RRC message in the message 601 associated with an identity information of donor DU corresponds to the respective RRC message including the identity information associated with the same donor DU in the message 602. This correspond uses the identity information associated with a donor DU identity, instead of using the identity information associated with index numbers in the example of FIG. 6b.

For example, each RRC message in the message 602 may correspond to a RRC message in the message 601 and vice versa, based on an identity information (for example, an index number, or an identity or address of a donor DU, and so on).

For example, in the message 601, the donor DU identity 1 corresponds to the donor DU 103, the donor DU identity 2 corresponds to the donor DU 105, the donor DU identity 3 corresponds to the donor DU 106, and so on. After the migration, the node 120 checks which Donor-DU it is connected, and determines the RRC message corresponds to the identity of the connected Donor-DU in 603. The determined RRC message includes the identity of the connected donor DU.

For example, in the message 602, the condition 1 includes identifiers of the cells 113, 114, and 115, so that the node 120 transmits the buffered RRC message 1' to the node 121 if the node 120 connects to one of the cells 113, 114, and 115 after the migration, and the RRC message 1' may include an identity or address of the donor DU 103; the condition 2 includes an identity of the cell 118, so that the node 120 transmits the buffered RRC message 2' to the node 121 if the node 120 connects to the cell 118 after the migration, and the RRC message 2' may include an identity or address of the donor DU 105; the condition 3 includes an identity of the cell 119, so that the node 120 transmits the buffered RRC message 3' to the node 121 if the node 120 connects to the cell 119 after the migration, and the RRC message 3' may include an identity or address of the donor DU 106; and so on. The condition may also include the identity or address of node, or donor-DU.

Then, for example, in the operation 603, if the node 120 determines that condition 1 is satisfied, the node 120 may transmit the RRC message 1' including an identity or address of the donor DU 103 to the node 121 via the message 604. Then, in the operation 605, the node 121 may determine to transmit the RRC message 1 to the node 122 based on the identity of the donor DU 103 in the message 604.

For example, if the node 120 determines that condition 3 is satisfied, the node 120 may transmit the RRC message 3' including an identity or address of the donor DU 106 to the node 121 via the message 604. Then, in the operation 605, the node 121 may determine to transmit the RRC message 3 to the node 122 based on the identity or address of the donor DU 106 received in the message 604, and the identity associated with the RRC message received in 601. For example, when the node 121 determines that the identity associated with RRC message 3 received in 601 corresponds to the identity or address of the donor DU received in the message 604, the node 121 may determine to transmit the RRC message 3 to the node 122.

In some example embodiments, respective RRC messages for the node 121 may include information associated with identity or address of corresponding donor DU, and thus the message 604 from the node 120 to the node 121 may be a RRC message including the information associated with the identity of corresponding donor DU.

In some example embodiments, the message 601 may include one information item so that a single RRC message for the node 122 is buffered at the node 121, and the message 602 may include one information item so that a single RRC message for the node 121 is buffered at the node 120. Then, for example, instead of the identity, the message 604 from the node 120 to the node 121 may include a flag or indication for indicating the node 121 to transmit the single buffered RRC message for the node 122.

As illustrated in the above examples, a transmission of a RRC message between nodes in the IAB network may be performed conditionally, and a service interruption caused by the migration may be avoided or reduced.

It is appreciated that this disclosure is not limited to the above examples.

Figure 7:
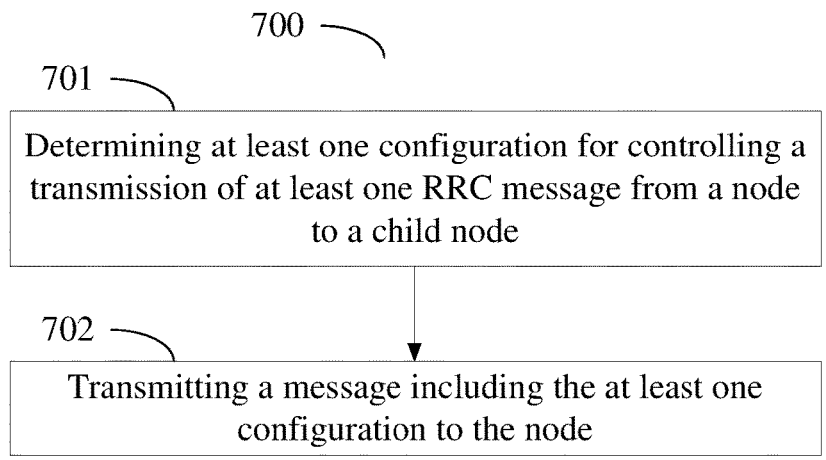
FIG. 7 illustrates an example method for controlling message transmissions in an IAB network in an example embodiment.

FIG. 7 illustrates an example method 700 for controlling message transmissions in an IAB network in an example embodiment. For example, the example method 700 may be performed by a donor CU in an IAB network, such as the donor CU 101 or 102 in the above examples.

As illustrated in FIG. 7, the example method 700 may include an operation 701 and an operation 702. In the operation 701, the donor CU may determine at least one configuration for controlling a transmission of at least one first RRC message from a node to a child node of the node in the IAB network, and in the operation 702, the donor CU may transmit a message including the at least one configuration to the node.

For example, the node in the example method 700 may be the node 120 in the above examples, the child node in the example method 700 may be the node 121 in the above examples, and the at least one configuration may include at least one configuration in at least one of the messages 202 and 602 in the above examples, for example at least one of: at least one RRC message; at least one condition; an indication for discarding; an identity (for example, an index number corresponding to a RRC message, an identity or address of a donor DU unit, or the like); and so on. For example, the node in the example method 700 may be the node 121 in the above examples, the child node in the example method 700 may be the node 122 in the above examples, and the at least one configuration may include the at least one configuration in at least one of the messages 201, 302, 403, 503, 505, and 601, for example at least one of: at least one RRC message; at least one condition; an indication for discarding; an identity (for example, an index number corresponding to a RRC message, an identity or address of a donor DU unit, or the like); and so on.

In some example embodiments, in the example method 700, the donor CU may further determine at least one another configuration for controlling a transmission of at least one second RRC message from the child to a child node of the child node in the IAB network, and may transmit a message including the at least one another configuration to the child node of the node.

For example, in a case where the node in the example method 700 is the node 120 in the above examples and the child node of the node in the example method 700 is the node 121 in the above examples, in the example method 700, besides to the operations 701 and 702 for the node 120, the donor CU may also transmit at least one another configuration to the node 121, and the node 121 may use the at least one another configuration to control a transmission of at least one second RRC message for the node 122. For example, the at least one another configuration may include the information in at least one of the messages 201, 302, 403, 503, 505, and 601 in the above examples.

Figure 8:
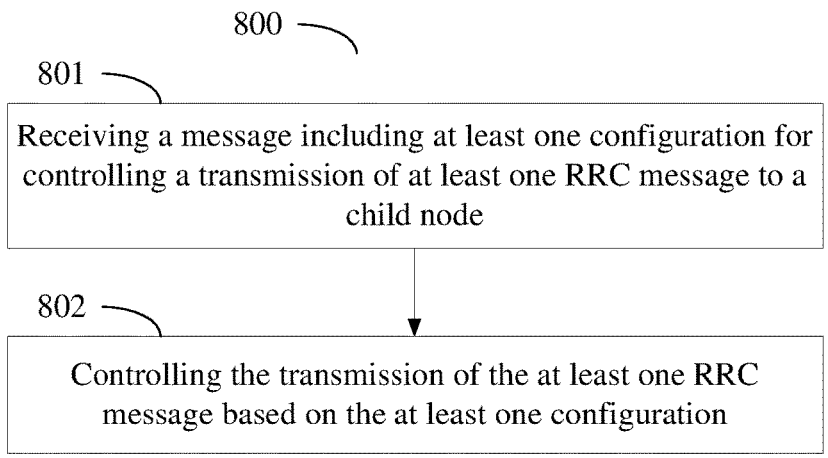
FIG. 8 illustrates an example method for controlling message transmissions in an IAB network in an example embodiment.

FIG. 8 illustrates an example method 800 for controlling message transmissions in an IAB network in an example embodiment. For example, the example method 800 may be performed by a node in an IAB network, such as the node 107, 108, 109, 110, 111, 112, 120, 121, 122, and so on in the above examples.

As illustrated in FIG. 8, the example method 800 may include an operation 801 and an operation 802. In the operation 801, the node may receive a message including at least one configuration for the node to control a transmission of at least one RRC message to a child node of the node in the IAB network. In the operation 802, the node may control the transmission of the at least one RRC message based on the at least one configuration received in the operation 801.

For example, an example of the node in the example method 800 may be the node 120 in the above examples. Then, the at least one configuration received in the operation 801 may include at least one configuration in at least one of the messages 202, 401, 501, and 602 in the above examples, for example at least one of: at least one RRC message; at least one condition; an indication for discarding; an identity (for example, an index number corresponding to a RRC message, an identity or address of a donor DU unit, or the like); and so on. An example of the operation 802 may include at least one of the operations 203, 301 and 603 in the above examples. Further, in some examples of the operation 802, the node may further transmit one RRC message including an identity associated with the transmitted RRC message to the child node, for example via the message 604 in the above examples.

For example, the node in the example method 800 may be the node 121 in the above examples. Then, the at least one configuration received in the operation 801 may include at least one configuration in at least one of the messages 201, 302, 403, 503, 505, and 601 in the above examples, for example at least one of: at least one RRC message; at least one condition; an indication for discarding; an identity (for example, an index number corresponding to a RRC message, an identity or address of a donor DU unit, or the like); and so on. An example of the operation 802 may include at least one of the operations 303 and 605 in the above examples. Further, in some examples of the operation 802, the node may further receive one RRC message including an identity associated with the transmitted RRC message from its parent node, for example via the message 604 in the above examples.

Figure 9:
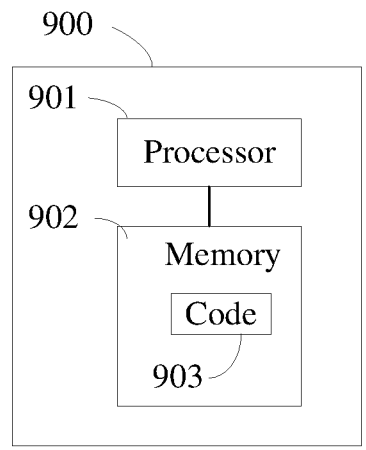
FIG. 9 illustrates an example apparatus for controlling message transmissions in an IAB network in an example embodiment.

FIG. 9 illustrates an example apparatus 900 for controlling message transmissions in an IAB network in an example embodiment, which may be at least a part of a donor CU in the IAB network.

As shown in FIG. 9, the example apparatus 900 may include at least one processor 901 and at least one memory 902 that may include computer program code 903, where the at least one memory 902 and the computer program code 903 may be configured to, with the at least one processor 901, cause the apparatus 900 at least to perform at least the operations of the example method 700 described above.

In various example embodiments, the at least one processor 901 in the example apparatus 900 may include, but not limited to, at least one hardware processor, including at least one microprocessor such as a central processing unit (CPU), a portion of at least one hardware processor, and any other suitable dedicated processor such as those developed based on for example Field Programmable Gate Array (FPGA) and Application Specific Integrated Circuit (ASIC). Further, the at least one processor 901 may also include at least one other circuitry or element not shown in FIG. 9.

In various example embodiments, the at least one memory 902 in the example apparatus 900 may include at least one storage medium in various forms, such as a volatile memory and/or a non-volatile memory. The volatile memory may include, but not limited to, for example, a random-access memory (RAM), a cache, and so on. The non-volatile memory may include, but not limited to, for example, a read only memory (ROM), a hard disk, a flash memory, and so on. Further, the at least memory 902 may include, but are not limited to, an electric, a magnetic, an optical, an electromagnetic, an infrared, or a semiconductor system, apparatus, or device or any combination of the above.

Further, in various example embodiments, the example apparatus 900 may also include at least one other circuitry, element, and interface, for example at least one I/O interface, at least one antenna element, and the like.

In various example embodiments, the circuitries, parts, elements, and interfaces in the example apparatus 900, including the at least one processor 901 and the at least one memory 902, may be coupled together via any suitable connections including, but not limited to, buses, crossbars, wiring and/or wireless lines, in any suitable ways, for example electrically, magnetically, optically, electromagnetically, and the like.

It is appreciated that implementations in the donor CU for controlling message transmissions in an IAB network are not limited to the example apparatus 900. In another example embodiments, an example apparatus for controlling message transmissions in the IAB network, which may be at least a part of the donor CU in the IAB network, may include means for performing operations in the example method 700, including means for performing the operation 701 and means for performing the operation 702.

In some example embodiments, examples of means may also include circuitries, software modules and any other suitable function entities. The term "circuitry" throughout this disclosure may refer to one or more or all of the following: (a) hardware-only circuit implementations (such as implementations in only analog and/or digital circuitry); (b) combinations of hardware circuits and software, such as (as applicable) (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation. This definition of circuitry applies to one or all uses of this term in this disclosure, including in any claims. As a further example, as used in this disclosure, the term circuitry also covers an implementation of merely a hardware circuit or processor (or multiple processors) or portion of a hardware circuit or processor and its (or their) accompanying software and/or firmware. The term circuitry also covers, for example and if applicable to the claim element, a baseband integrated circuit or processor integrated circuit for a mobile device or a similar integrated circuit in server, a cellular network device, or other computing or network device.

Figure 10:
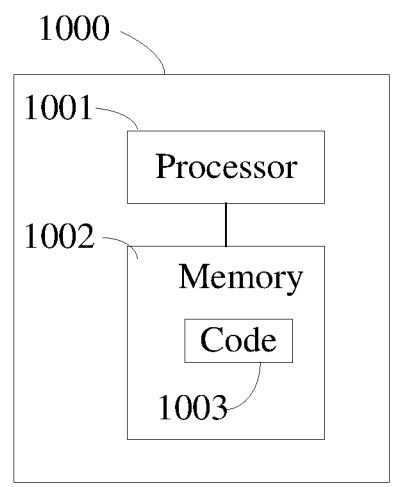
FIG. 10 illustrates an example apparatus for controlling message transmissions in an IAB network in an example embodiment.

FIG. 10 illustrates an example apparatus 1000 for controlling message transmissions in an IAB network in an example embodiment, which may be at least a part of an IAB node in the IAB network.

As shown in FIG. 10, the example apparatus 1000 may include at least one processor 1001 and at least one memory 1002 that may include computer program code 1003, where the at least one memory 1002 and the computer program code 1003 may be configured to, with the at least one processor 1001, cause the apparatus 1000 at least to perform at least the operations of the example method 800 described above.

In various example embodiments, the at least one processor 1001 in the example apparatus 1000 may include, but not limited to, at least one hardware processor, including at least one microprocessor such as a CPU, a portion of at least one hardware processor, and any other suitable dedicated processor such as those developed based on for example FPGA and ASIC. Further, the at least one processor 1001 may also include at least one other circuitry or element not shown in FIG. 10.

In various example embodiments, the at least one memory 1002 in the example apparatus 1000 may include at least one storage medium in various forms, such as a volatile memory and/or a non-volatile memory. The volatile memory may include, but not limited to, for example, a RAM, a cache, and so on. The non-volatile memory may include, but not limited to, for example, a ROM, a hard disk, a flash memory, and so on. Further, the at least memory 1002 may include, but are not limited to, an electric, a magnetic, an optical, an electromagnetic, an infrared, or a semiconductor system, apparatus, or device or any combination of the above.

Further, in various example embodiments, the example apparatus 1000 may also include at least one other circuitry, element, and interface, for example at least one I/O interface, at least one antenna element, and the like.

In various example embodiments, the circuitries, parts, elements, and interfaces in the example apparatus 1000, including the at least one processor 1001 and the at least one memory 1002, may be coupled together via any suitable connections including, but not limited to, buses, crossbars, wiring and/or wireless lines, in any suitable ways, for example electrically, magnetically, optically, electromagnetically, and the like.

It is appreciated that implementations in an IAB node for controlling message transmissions in an IAB network are not limited to the example apparatus 1000. In another example embodiments, an example apparatus for controlling message transmissions in the IAB network, which may be at least a part of an IAB node in the IAB network, may include means for performing operations in the example method 800, including means for performing the operation 801 and means for performing the operation 802. In some example embodiments, examples of means may also include circuitries, software modules and any other suitable function entities.

Another example embodiment may relate to computer program codes or instructions which may cause an apparatus to perform at least respective methods described above. Another example embodiment may be related to a computer readable medium having such computer program codes or instructions stored thereon. In some example embodiments, such a computer readable medium may include at least one storage medium in various forms such as a volatile memory and/or a non-volatile memory. The volatile memory may include, but not limited to, for example, a RAM, a cache, and so on. The non-volatile memory may include, but not limited to, a ROM, a hard disk, a flash memory, and so on. The non-volatile memory may also include, but are not limited to, an electric, a magnetic, an optical, an electromagnetic, an infrared, or a semiconductor system, apparatus, or device or any combination of the above.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "may," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Further, modifiers such as "first", "second" and so on throughout the description and claims are generally intended to distinguish different elements, operations, and so on, rather than emphasizing any importance, specific sequences, specific priorities, specific elements, and so on.

While some embodiments have been described, these embodiments have been presented by way of example, and are not intended to limit the scope of the disclosure. Indeed, the apparatus, methods, and systems described herein may be embodied in a variety of other forms; furthermore, various omissions, substitutions and changes in the form of the methods and systems described herein may be made without departing from the spirit of the disclosure. For example, while blocks are presented in a given arrangement, alternative embodiments may perform similar functionalities with different components and/or circuit topologies, and some blocks may be deleted, moved, added, subdivided, combined, and/or modified. At least one of these blocks may be implemented in a variety of different ways. The order of these blocks may also be changed. Any suitable combination of the elements and acts of some example embodiments described above can be combined to provide further embodiments. The accompanying claims and their equivalents are intended to cover such forms or modifications as would fall within the scope and spirit of the disclosure.

What is claimed is:

1. A method comprising:
   determining, by a donor central unit in an integrated access and backhaul network, at least one configuration for controlling a transmission of at least one first radio resource control message from a node to a child node of the node in the integrated access and backhaul network; and
   transmitting, by the donor central unit, a message including the at least one configuration to the node, wherein the at least one configuration comprises a first list of radio resource control messages for the child node of the node, and the method further comprises:
   transmitting, by the donor central unit to the child node of the node, a message including at least one another configuration for the child node of the node, the at least one another configuration including a second list of radio resource messages for a child node of the child node of the node and a radio resource control message in the first list including an identity associated with a radio resource control message in the second list.

2. The method of claim 1 wherein the at least one configuration comprises at least one of:
   the at least one first radio resource control message;
   a condition for enabling the node to transmit one of the at least one first radio resource control message to the child node; and
   a condition for enabling the node to discard the at least one first radio resource control message.

3. The method of claim 2 wherein the condition for enabling the node to transmit one of the at least one first radio resource control message comprises information associated with at least one of:
   at least one identity associated with the at least one first radio resource control message;
   at least one first cell or node for enabling the node to transmit one of the at least one first radio resource control message to the child node in a case where a cell or node that the node connects with after migration belongs to the at least one first cell or node; and
   at least one first donor distributed unit in the integrated access and backhaul network for enabling the node to transmit one of the at least one first radio resource control message to the child node in a case where a donor distributed unit that the node connects with after migration belongs to the at least one first donor distributed unit.

4. The method of claim 3 wherein an identity of the at least one identity comprises at least one of:
   an index number of a first radio resource control message among the at least one first radio resource control message;
   at least one identifier or address of at least one donor distributed unit in the integrated access and backhaul network;
   at least one identifier or address of at least one ancestor node of the node in the integrated access and backhaul network; and
   at least one identifier of at least one cell of the at least one ancestor node in the integrated access and backhaul network.

5. The method of claim 2 wherein the condition for enabling the node to discard the at least one first radio resource control message comprises information associated with at least one of:
   at least one second cell or node for enabling the node to discard the at least one first radio resource control message to the child node in a case where a cell or node that the node connects with after migration belongs to the at least one second cell or node;
   at least one second donor distributed unit in the integrated access and backhaul network for enabling the node to discard the at least one first radio resource control message to the child node in a case where a donor distributed unit that the node connects with after migration belongs to the at least one second donor distributed unit;
   at least one third cell or node for enabling the node to discard the at least one first radio resource control message to the child node in a case where a cell or node that the node connects with after migration does not belong to the at least one third cell or node;
   at least one third donor distributed unit in the integrated access and backhaul network for enabling the node to discard the at least one first radio resource control message to the child node in a case where a donor distributed unit that the node connects with after migration does not belong to the at least one third donor distributed unit; and
   an indication for the node to discard the at least one first radio resource control message.

6. A method comprising:
   receiving, by a node in an integrated access and backhaul network from a donor central unit in the integrated access and backhaul network, a message including at least one configuration for the node to control a transmission of at least one radio resource control message to a child node of the node in the integrated access and backhaul network; and
   controlling, by the node, the transmission of the at least one radio resource control message based on the at least one configuration, wherein the at least one configuration comprises a first list of radio resource control messages for the child node of the node, and the method further comprises:
   transmitting, by the donor central unit to the child node of the node, a message including at least one another configuration for the child node of the node, the at least one another configuration including a second list of radio resource messages for a child node of the child node of the node and a radio resource control message in the first list including an identity associated with a radio resource control message in the second list.

7. The method of claim 6 wherein the at least one configuration comprises at least one of:
   the at least one radio resource control message;
   a condition for enabling the node to transmit one of the at least one radio resource control message to the child node; and
   a condition for enabling the node to discard the at least one radio resource control message.

8. The method of claim 7 wherein the condition for enabling the node to transmit one of the at least one radio resource control message comprises information associated with at least one of:
- at least one identity associated with the at least one radio resource control message;
- at least one first cell or node for enabling the node to transmit one of the at least one radio resource control message to the child node in a case where a cell or node that the node connects with after migration belongs to the at least one first cell or node; and
- at least one first donor distributed unit in the integrated access and backhaul network for enabling the node to transmit one of the at least one radio resource control message to the child node in a case where a donor distributed unit that the node connects with after migration belongs to the at least one first donor distributed unit.

9. The method of claim 8 wherein an identity of the at least one identity comprises at least one of:
- an index number of a radio resource control message among the at least one radio resource control message;
- at least one identifier or address of at least one donor distributed unit in the integrated access and backhaul network;
- at least one identifier or address of at least one ancestor node of the node in the integrated access and backhaul network; and
- at least one identifier of at least one cell of the at least one ancestor node in the integrated access and backhaul network.

10. The method of claim 7 wherein the condition for enabling the node to discard the at least one radio resource control message comprises information associated with at least one of:
- at least one second cell or node for enabling the node to discard the at least one radio resource control message to the child node in a case where a cell or node that the node connects with after migration belongs to the at least one second cell or node;
- at least one second donor distributed unit in the integrated access and backhaul network for enabling the node to discard the at least one radio resource control message to the child node in a case where a donor distributed unit that the node connects with after migration belongs to the at least one second donor distributed unit;
- at least one third cell or node for enabling the node to discard the at least one radio resource control message to the child node in a case where a cell or node that the node connects with after migration does not belong to the at least one third cell or node;
- at least one third donor distributed unit in the integrated access and backhaul network for enabling the node to discard the at least one radio resource control message to the child node in a case where a donor distributed unit that the node connects with after migration does not belong to the at least one third donor distributed unit; and
- an indication for the node to discard the at least one radio resource control message.

11. The method of claim 6 wherein the controlling comprises:
discarding the at least one radio resource control message based on the at least one configuration.

12. The method of claim 6 wherein the controlling comprises:
- determining one of the at least one radio resource control message based on the at least one configuration; and
- transmitting, to the child node, at least one of: the determined radio resource control message; and an identity associated with the determined radio resource control message.

13. The method of claim 6 wherein the controlling comprises:
- receiving an identity from a parent node of the node in the integrated access and backhaul network;
- determining one of the at least one radio resource control message based on the identity and the at least one configuration; and
- transmitting the determined radio resource control message to the child node.

14. The method of claim 13 wherein the identity from the parent node comprises at least one of:
- an index number of a radio resource control message from the parent node;
- an identifier or address of a donor distributed unit in the integrated access and backhaul network;
- an identifier or address of an ancestor node of the node in the integrated access and backhaul network; and
- an identifier of a cell of the ancestor node in the integrated access and backhaul network.

15. An apparatus comprising:
- at least one processor; and
- at least one memory including computer program code, the at least one memory and the computer program code being configured to, with the at least one processor, cause the apparatus as at least a part of a donor central unit in an integrated access and backhaul network to perform:
- determining at least one configuration for controlling a transmission of at least one first radio resource control message from a node to a child node of the node in the integrated access and backhaul network; and
- transmitting a message including the at least one configuration to the node, wherein the at least one configuration comprises a first list of radio resource control messages for the child node of the node, and the method further comprises:
- transmitting, by the donor central unit to the child node of the node, a message including at least one another configuration for the child node of the node, the at least one another configuration including a second list of radio resource messages for a child node of the child node of the node and a radio resource control message in the first list including an identity associated with a radio resource control message in the second list.

16. The apparatus of claim 15 wherein the at least one configuration comprises at least one of:
- the at least one first radio resource control message;
- a condition for enabling the node to transmit one of the at least one first radio resource control message to the child node; and
- a condition for enabling the node to discard the at least one first radio resource control message.

17. The apparatus of claim 16 wherein the condition for enabling the node to transmit one of the at least one first radio resource control message comprises information associated with at least one of:
- at least one identity associated with the at least one first radio resource control message;
- at least one first cell or node for enabling the node to transmit one of the at least one first radio resource control message to the child node in a case where a cell or node that the node connects with after migration belongs to the at least one first cell or node; and at least one first donor distributed unit in the integrated access and backhaul network for enabling the node to transmit one of the at least one first radio resource control message to the child node in a case where a donor distributed unit that the node connects with after migration belongs to the at least one first donor distributed unit.

18. The apparatus of claim 17 wherein an identity of the at least one identity comprises at least one of:

an index number of a first radio resource control message among the at least one first radio resource control message;

at least one identifier or address of at least one donor distributed unit in the integrated access and backhaul network;

at least one identifier or address of at least one ancestor node of the node in the integrated access and backhaul network; and at least one identifier of at least one cell of the at least one ancestor node in the integrated access and backhaul network.

19. The apparatus of claim 16 wherein the condition for enabling the node to discard the at least one first radio resource control message comprises information associated with at least one of:

at least one second cell or node for enabling the node to discard the at least one first radio resource control message to the child node in a case where a cell or node that the node connects with after migration belongs to the at least one second cell or node;

at least one second donor distributed unit in the integrated access and backhaul network for enabling the node to discard the at least one first radio resource control message to the child node in a case where a donor distributed unit that the node connects with after migration belongs to the at least one second donor distributed unit;

at least one third cell or node for enabling the node to discard the at least one first radio resource control message to the child node in a case where a cell or node that the node connects with after migration does not belong to the at least one third cell or node;

at least one third donor distributed unit in the integrated access and backhaul network for enabling the node to discard the at least one first radio resource control message to the child node in a case where a donor distributed unit that the node connects with after migration does not belong to the at least one third donor distributed unit; and an indication for the node to discard the at least one first radio resource control message.

* * * * *